United States Patent
Quesnel

(10) Patent No.: US 7,092,989 B2
(45) Date of Patent: Aug. 15, 2006

(54) INTERNET-BASED LUBRICANT EVALUATION AND REPORTING SYSTEM

(75) Inventor: William A. Quesnel, Burlington (CA)

(73) Assignee: Cinrg Systems Inc., Burlington (CA)

( * ) Notice: Subject to any disclaimer, the term of this patent is extended or adjusted under 35 U.S.C. 154(b) by 768 days.

(21) Appl. No.: 10/178,355

(22) Filed: Jun. 25, 2002

(65) Prior Publication Data

US 2003/0236855 A1 Dec. 25, 2003

(51) Int. Cl.
*G06F 15/16* (2006.01)
(52) U.S. Cl. ...................................... 709/203; 709/217
(58) Field of Classification Search ................. 709/203
See application file for complete search history.

(56) References Cited

U.S. PATENT DOCUMENTS

| | | | |
|---|---|---|---|
| 6,324,541 B1 * | 11/2001 | de l'Etraz et al. | 707/104.1 |
| 2002/0016746 A1 * | 2/2002 | McHenry et al. | 705/26 |
| 2002/0059269 A1 * | 5/2002 | McQuown et al. | 707/100 |
| 2002/0174231 A1 * | 11/2002 | Surloff et al. | 709/227 |
| 2002/0174237 A1 * | 11/2002 | Shrinivasan et al. | 709/229 |
| 2004/0111274 A1 * | 6/2004 | O'Rourke et al. | 705/1 |

OTHER PUBLICATIONS

Quesnel Jr., William A., Maintenance Extranet, PowerPoint presentation, 52 slides, POA 2000, Tulsa, OK, USA, Oct. 24-26, 2000.

Quesnel Jr., William A., (2000), Virtual Results in Oil Analysis, Practicing Oil Analysis, Nov.-Dec. 2000, Tulsa, OK, USA.
Quesnel Jr., William A., (2000), WebCheck—An Oil Analysis Based Maintenance Extranet System, WearCheck Canada Inc., Canada.

* cited by examiner

*Primary Examiner*—Rupal Dharia
*Assistant Examiner*—Nicholas R. Taylor
(74) *Attorney, Agent, or Firm*—Hofbauer Associates; Patrick J. Hofbauer; Kevin E. Holbeche

(57) ABSTRACT

Internet-based lubricant evaluation and reporting system comprising an application service provider. A server operable by the application service provider includes an operating control system, an Internet connection and lubricant evaluation software executable on the control system to manage a database of lubricant related data. A hypertext markup language compliant page displays output generated by the lubricant evaluation software and an embedded function, and is operable to facilitate data communications related to the lubricant evaluation software over the Internet between the server an Internet browser running on a computer remote from the application service provider. The embedded function is operable to run at the server, when an Internet browser accesses the hypertext markup language compliant page, and the embedded function is selected, to thereby permit selected access by a user of the Internet browser to the lubricant evaluation software in order to access the lubricant related data.

75 Claims, 23 Drawing Sheets

WebCheck

File  Edit  View  Bookmark  Help
◀  ▼  ▲  ▶    Address  http://www.oilanalysis.net/WebCheck_Session.asp  ▶ main | view | explorer | OEM | reports | community | admin | help | logout

Problem Sample Drill-Down main | >> show reporting menu

Sample Summary Report available action
select a cell

|  | Totals | | | Dirt | | | Water | | | Fuel | | | Soot | | | Cobustio | | |
|---|---|---|---|---|---|---|---|---|---|---|---|---|---|---|---|---|---|---|
|  | tot | A | S | A | S | rep | A | S | rep | A | S | rep | A | S | rep | A | S | |
| Fleet Trucking | 22703 | 3878 | 1911 | 271 | 102 | 0 | 13 | 1 | 0 | 131 | 569 | 0 | 602 | 37 | 0 | 67 | 0 | 0 |

— 110

Sample Criteria
Current Criteria
>> Sample Dates
 For last quater
>> Problem Codes
 For all problem codes
>> Compare by Location at
 not set yet
>> Generate Report

Set Criteria
>> Date Range
[Last quater ▼]

INTERNET-BASED LUBRICANT EVALUATION AND REPORTING SYSTEM

FIELD OF THE INVENTION

The present invention relates to lubricant evaluation and reporting systems, and more particularly to Internet-based lubricant evaluation and reporting systems.

BACKGROUND OF THE INVENTION

It is common for an operator or owner of machinery, equipment, or commercial vehicles, and the like, including organizations and individuals, to have lubricant analysis performed on their machinery, equipment, and vehicles. Typically, lubricant analysis checks oil samples from the equipment, machinery and vehicles for foreign particles, such as wear particles, contaminants, and oil additives. Also, screening processes are used to check for white metal, babbitt, precipitate, silt, debris, and dirt. Such lubricant analysis can indicate many significant factors about machinery, equipment, and vehicles. Accordingly, such feedback about lubrication is vital to a proper and complete maintenance program, and is paramount to the ongoing operation of machinery, equipment, and vehicles, and leads to reduced breakdowns and increased mechanical longevity.

Typically, such an operator or owner is a client of an oil analysis company, and sends regular lubricant samples taken from the machinery, equipment, and vehicles, to a certified laboratory that conducts various types of tests on the lubricants. The laboratory might be part of the oil analysis company or might be an independent laboratory. Typically, a few days after the samples are shipped for analysis, the client would typically receive from the oil analysis company a written report setting forth and explaining the results of the tests.

In the event that a client has several locations, the lubricant samples may be sent to one specific laboratory, which may be undesirable due to the distances that lubricant samples might have to be shipped, especially if the client has operations in more than one country. Alternatively, the lubricant samples could be sent to local laboratories. However, this is undesirable since, in the industry, there is a lack of proper standardization of tests or test results.

Also, each location of a client's operation would most likely not be aware of the results of lubricants tests performed at other locations. This information is therefore typically not shared between various locations of a client's company.

Further, it is almost certainly not shared between companies, and also generally is not forwarded to lubricant suppliers, original equipment manufacturers, industry consultants, and so on. The client is only able to share in the knowledge and experience of the one oil analysis company, but has little opportunity to share in the knowledge and experience of the lubricant community in general. This lack of sharing of information extends beyond basic lubricant analysis data, since lubricant analysis data is also used to determine various characteristics of machinery, equipment, vehicles, and the like, and also suitability of lubricants, and so on.

The above discussed problems are largely due to the lack of cooperation within the industry, as a result of the normal level of competition that exists between companies. However, another even more significant reason for these problems has recently become apparent. There is a general lack of integrated information systems within the industry, or in other words, there is a lack of a common platform available to oil analysis companies and their clients, and to the industry in general. Most oil analysis companies offer their own version of a client-based oil analysis software package. However, these client-based software packages offer varying levels of functionality ranging from the ability to view oil analysis data and reports, to software packages that allow the client to fully manage their oil analysis program. Alternatively, a client can use a cumbersome oil analysis software package purchased at considerable expense from a software provider. Although the client can use several laboratories to perform oil analysis, the software is designed to view oil analysis data, and is not designed to be compatible with an oil analysis company's software. Accordingly, the system only accepts basic oil analysis data, which may be insufficient. Further, there is no way for the client to send data back to the oil analysis company.

Even more specifically, there is a lack of industry standards for data exchange, which completely precludes test results and other data from being readily exchanged. For instance, in the oil analysis industry, each one of over 250 commercial laboratories and 2000 private laboratories in North America operates its own Laboratory Information Management System (LIMS). Each of the above discussed software packages uses a proprietary format for the exchange of data between the oil analysis LIMS and the client software, thus virtually ensuring that test results and other data cannot be readily exchanged, thus keeping interaction between the client and laboratory essentially insular.

For these reasons, only a small percentage of clients actually use a client software package.

Furthermore, a client might need to switch from their present lubricant analysis laboratory to another lubricant analysis laboratory. At best, the client is faced with fragmentation of data, and possibly a complete loss of oil analysis data, which is completely unacceptable The lack of sharing of lubricant related information also lessens the effectiveness of maintenance programs, especially within larger companies. Typically, for each location owned by a client, the maintenance data is stored in a separate system, generally with no way to collaborate data from any two systems.

It is an object of the present invention to provide an Internet-based lubricant evaluation and reporting system.

It is an object of the present invention to provide an Internet-based lubricant evaluation and reporting system, wherein there are lubricant standardized tests performed in a laboratory.

It is another object of the present invention to provide an Internet-based lubricant evaluation and reporting system, wherein the lubricant test result information can be shared between various locations of a client's company.

It is another object of the present invention to provide an Internet-based lubricant evaluation and reporting system, wherein lubricant analysis data is shared between clients, lubricant suppliers, original equipment manufacturers, industry consultants, and so on.

It is yet another object of the present invention to provide an Internet-based lubricant evaluation and reporting system, wherein lubricant analysis data is used to determine various characteristics of machinery, equipment, vehicles, and the like.

It is a further object of the present invention to provide an Internet-based lubricant evaluation and reporting system, which evaluation and reporting system provides a common platform available to oil analysis companies and their clients, and to the industry in general.

It is a further object of the present invention to provide an Internet-based lubricant evaluation and reporting system, wherein common industry standards for data exchange are used It is still a further object of the present invention to provide an Internet-based lubricant evaluation and reporting system, wherein clients can readily switch from one laboratory to another without loss of lubricant analysis data and use thereof.

It is yet a further object of the present invention to provide an Internet-based lubricant evaluation and reporting system, which lubricant evaluation and reporting system is used to enhance the effectiveness of a maintenance program of machinery, equipment, vehicles, and the like.

SUMMARY OF THE INVENTION

In accordance with one aspect of the present invention there is disclosed a novel Internet-based lubricant evaluation and reporting system which utilizes an application service provider. A server is operable by the application service provider, which server includes an operating control system, an Internet connection and lubricant evaluation software executable on the control system to administer a database of lubricant related data. A hypertext markup language compliant page is on the server and is accessible through the Internet connection. The hypertext markup language compliant page displays output generated by the lubricant evaluation software and has an embedded function displayed on the page and is operable to facilitate the aforesaid data communications related to the use of the lubricant evaluation software over the Internet between the server and the client. The embedded function is operable to run at the server, when the Internet browser running on the remote computer accesses the hypertext markup language compliant page, and the embedded function is selected, to thereby permit selected access by the client using the Internet browser to the lubricant evaluation software, in order to access the lubricant related data.

In accordance with another aspect of the present invention there is disclosed a novel Internet-based lubricant evaluation and reporting system which utilizes an application service provider. A server is operable by the application service provider. The server includes an operating control system, and an Internet connection and lubricant evaluation software executable on the control system to administer a database of lubricant related data. A client connected over the Internet to the application service provider, by an Internet browser running on a remote computer non-local from the application service provider, to thereby facilitate communications related to the use of the lubricant evaluation software over the Internet between the server and the client. An industry associate is connected over the Internet to the application service provider, by an Internet browser running on a remote computer non-local from the application service provider, to thereby facilitate communications related to the use of the lubricant evaluation software over the Internet between the server and the industry associate. The client and industry associate are thereby interconnected through the Internet and the server to facilitate data communications between the client and the industry associate.

In accordance with yet another aspect of the present invention there is disclosed a novel Internet-based lubricant evaluation and reporting system comprises an application service provider. A server is operable by the application service provider. The server includes an operating control system, an Internet connection and lubricant evaluation software executable on the control system to administer a database of lubricant related data. The data on the database comprises records uniquely related to each of a plurality of clients, the records for each client being separate and distinct from the records for each other client. There is software executable on the server for permitting each of the plurality of clients to access its own uniquely related records in the database, and for selectively precluding each of the plurality of clients from accessing the records in the database of each other client. There is software executable on the server for receiving input from each one of the plurality of clients. There is also software executable on the server for selectively transmitting data from the server to each of the plurality of clients.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the an Internet-based lubricant evaluation and reporting system according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 18 is a partial computer screen printout showing industry standard data in a report generated by the Internet-based lubricant evaluation and reporting system of FIG. 1;

DETAILED DESCRIPTION OF A PREFERRED EMBODIMENT

Figure 2:
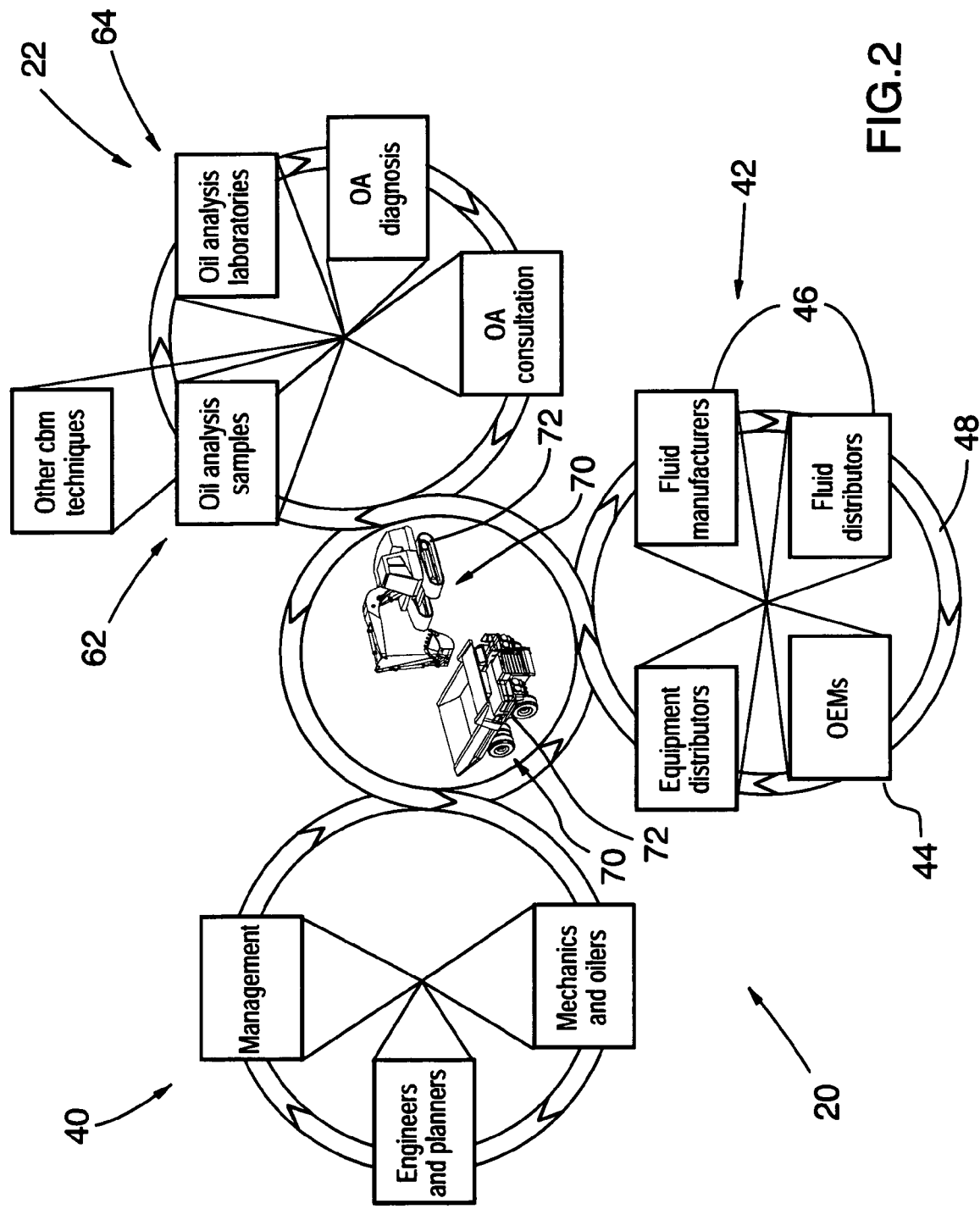
FIG. 2 is a pictorial representation of the Internet-based lubricant evaluation and reporting system of FIG. 1, showing the relationship between the equipment, machinery, and vehicles from which lubricants samples are taken, and the various components of the Internet-based lubricant evaluation and reporting system.
Figure 3:
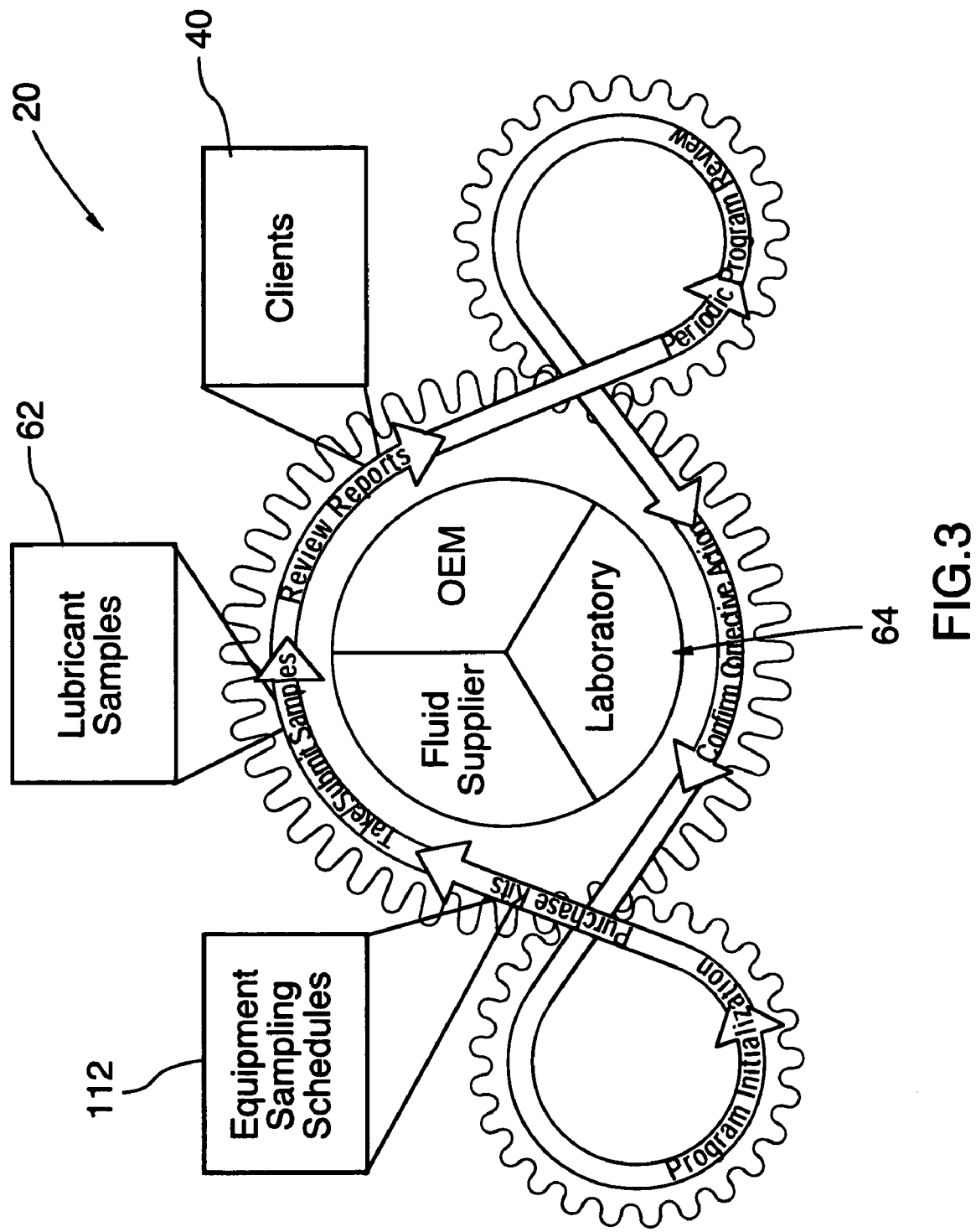
FIG. 3 is a diagrammatic representation of the overall lubricant analyses cycle of the Internet-based lubricant evaluation and reporting system of FIG. 1.
Figure 4:
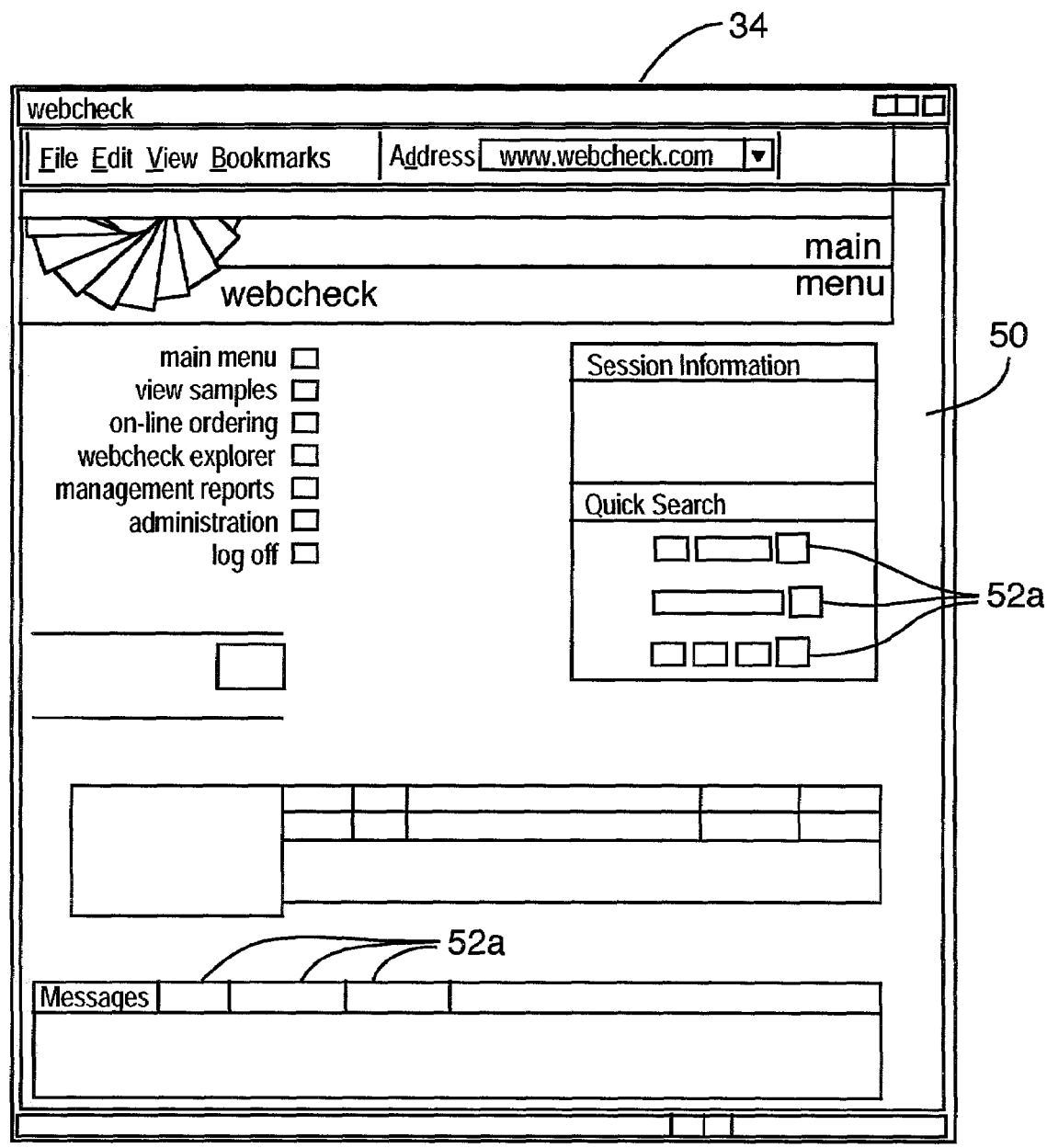
FIG. 4 is a computer screen printout of the main menu page of the Internet-based lubricant evaluation and reporting system of FIG. 1.
Figure 5:
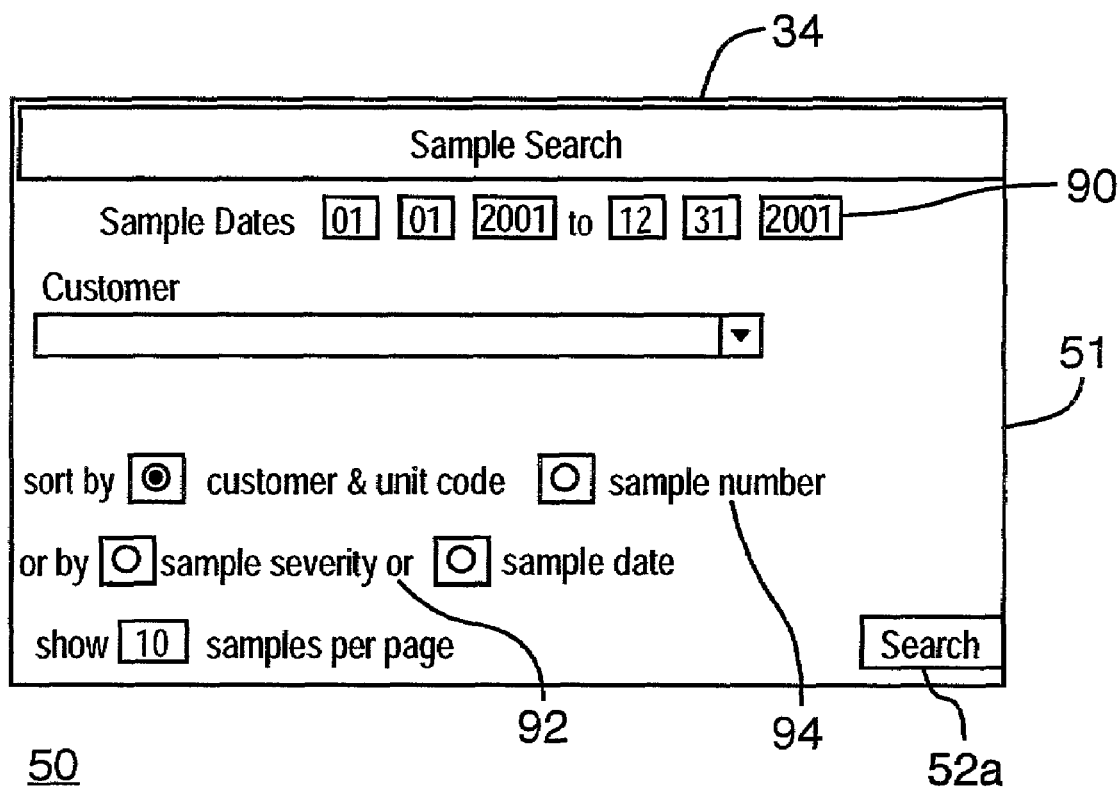
FIG. 5 is a computer screen printout for performing a search using the Internet-based lubricant evaluation and reporting system of FIG. 1.
Figure 6:
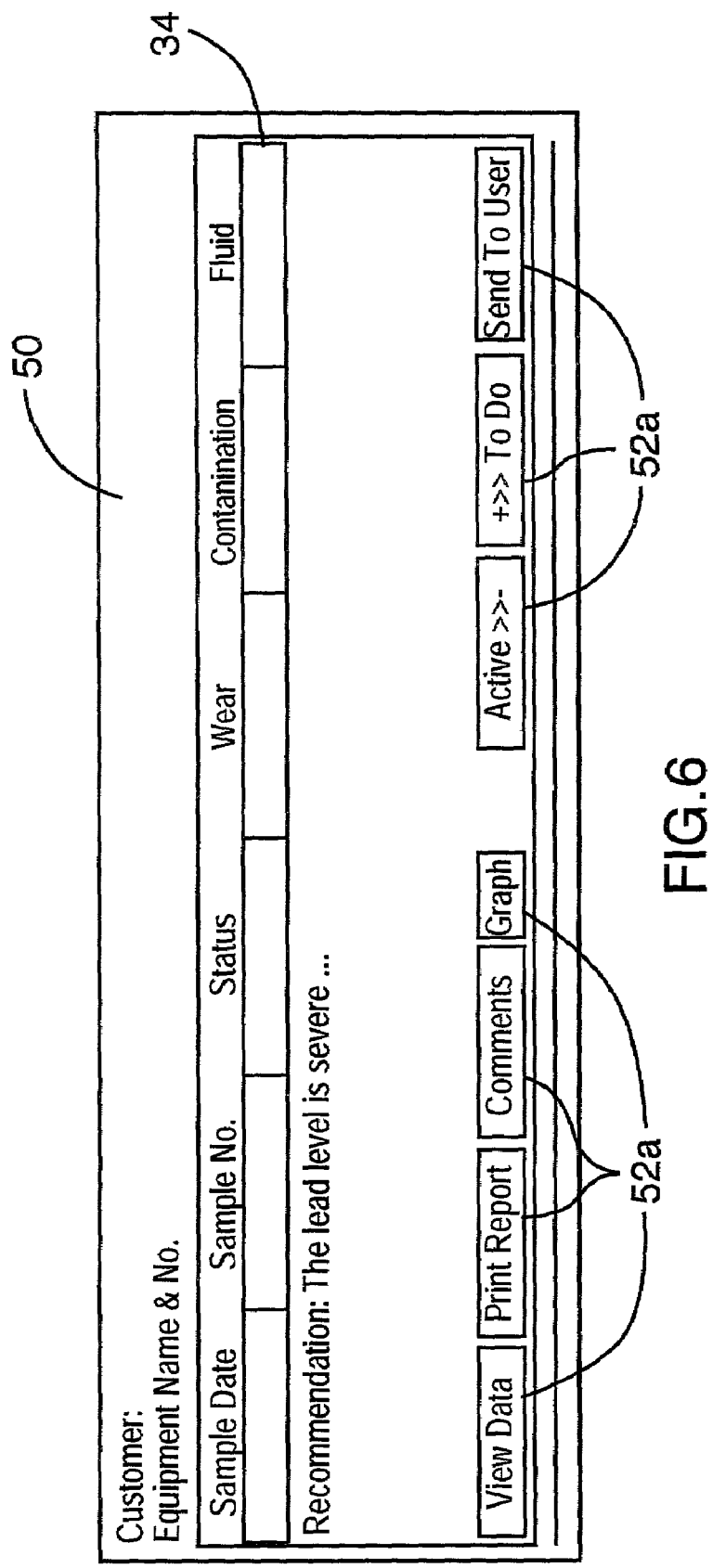
FIG. 6 is a computer screen printout showing various data related to a lubricant sample that has been analysed in a laboratory, and which data has been entered into the Internet-based lubricant evaluation and reporting system of FIG. 1.

Reference will now be made to FIGS. 1 through 23 of the drawings, which show a preferred embodiment of the Internet-based lubricant evaluation and reporting system of the present invention, as indicated by general reference numeral 20. As can be best seen in FIGS. 1 through 3, the Internet-based lubricant evaluation and reporting system 20 of the present invention comprises an application service provider, as indicated by general reference numeral 22, or equivalently, in more recent but less familiar terminology, a vertical service provider. The application service provider 22 preferably operates as an oil analysis company, since a high level of expertise in the field of lubricants is paramount to the proper operation of the Internet-based lubricant evaluation and reporting system 20 of the present invention.

A server 24 comprising one or more high speed computers, as is well known in the industry, is typically located at the application service provider 22, and in the preferred embodiment as illustrated, comprises a database server 24a, a Web (Internet) application server 24b, and an E-mail server 24c. These servers 24 are operable by the application service provider 22, and include an operating control system 26, and an Internet connection 28 operating through a firewall 29.

The server 24 also comprises lubricant evaluation software 30 executable on the control system 26, which lubricant evaluation software 30 typically represents one of the two major constituents of the preferred embodiment Internet-based lubricant evaluation and reporting system 20 of the present invention. The lubricant evaluation software 30 administers a database of lubricant related data 32, which is the other major constituent of the preferred embodiment Internet-based lubricant evaluation and reporting system 20 of the present invention. Both the lubricant evaluation software 30 and the database of lubricant related data 32 will be discussed in greater detail subsequently.

Figure 1:
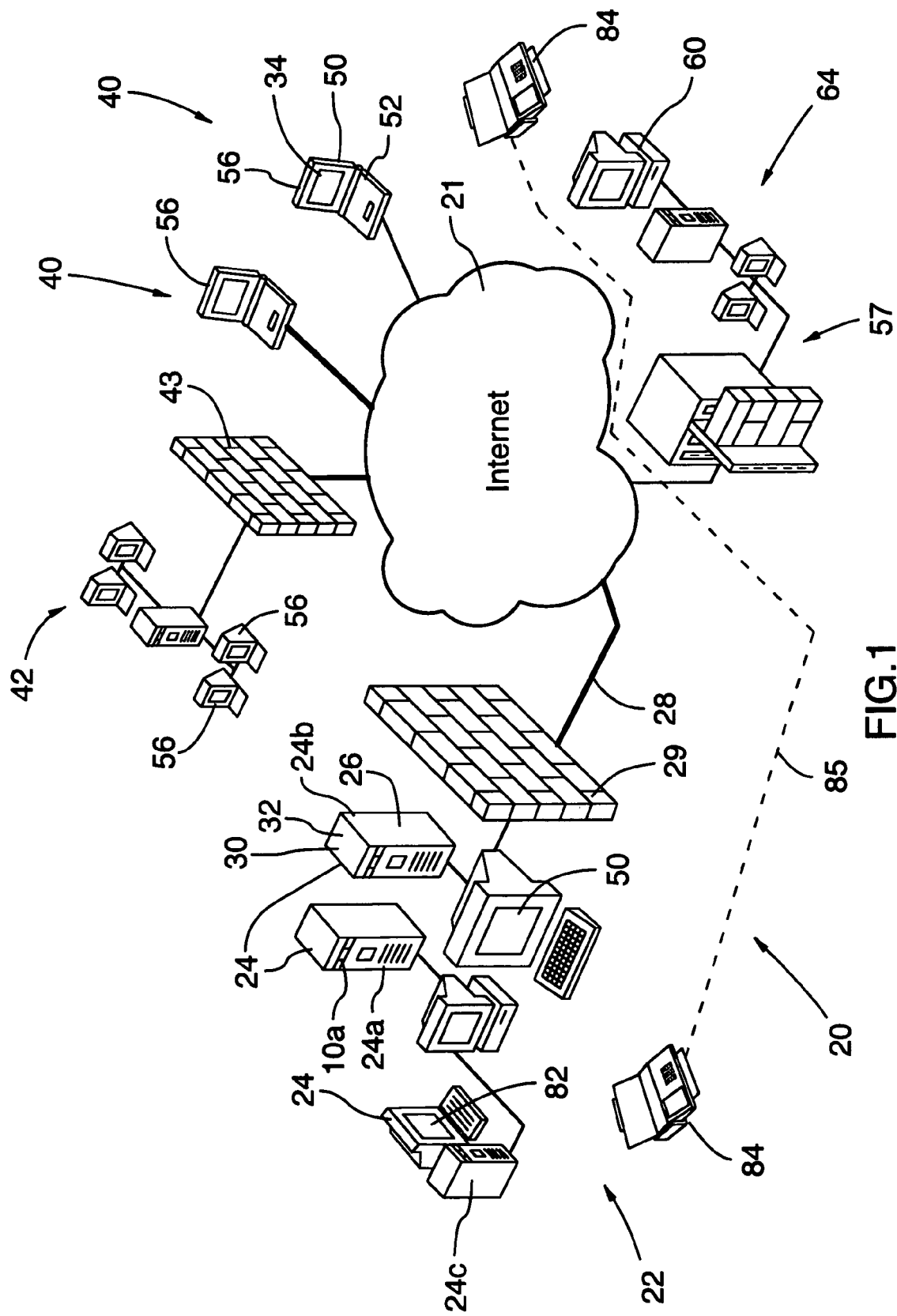
FIG. 1 is a diagrammatic representation of a preferred embodiment of the Internet-based lubricant evaluation and reporting system according to the present invention.

The reporting system also preferably comprises at least one client, and preferably a plurality of clients 40, connected over the Internet 21 to the application service provider 22, as can be best seen in FIG. 1, by an Internet browser 54 running on a remote computer 56 of the respective client(s) 40 that is/are non-local from the application service provider 22. The connection of a plurality of clients 40 to the server 24 facilitates communications related to the use of the lubricant evaluation software 30 over the Internet 21 between the server 24 and the clients 40. The communications related to the lubricant evaluation software 30 are conducted via hypertext markup language compliant pages 50 on the server 24 starting with the main menu page shown in FIG. 4, and as shown in FIGS. 4 through 10 and 12 through 23. The lubricant evaluation software 30 permits each of the plurality of clients 40 to perform data entry through the Internet connection 28.

At least one lubricant test laboratory, as indicated by general reference numeral 64, is connected through the Internet 21 to the application service provider 22, and in the preferred embodiment illustrated a plurality of lubricant test laboratories 64 are connected through the Internet 21 to the application service provider 22. Such connection of lubricant test laboratories 64 is to facilitate data communications related to the lubricant evaluation software 30 over the Internet 21 between the server 24 and the lubricant test laboratories 64. In this manner, test results 60, as best seen in FIG. 1, of lubricant samples, as indicated by the general reference numeral 62 in FIG. 2, can be sent from remote laboratories 64 to the oil analysis company, and the database of lubricant related data 32 can potentially be viewed by remote laboratories 64, if necessary.

One or more industry associates, indicated by the general reference numeral 42, are also connected through the Internet 21 to the application service provider 22 by an Internet browser 54 running on a remote computer 56 that is non-local from the application service provider 22. The connection of one or more industry associates 42 to server 24 facilitates communications related to the use of the lubricant evaluation software 30 over the Internet 21 between the server 24 and each of the industry associates 42 who is using a computer 56 that is non-local from the application service provider 22. An optional firewall 45 is interconnected between the industry associate 42 and the Internet. The clients 40 and industry associates 42 are thereby interconnected through the Internet 21 and the server 24 to facilitate data communications between the clients 40 and the industry associates 42.

Hypertext markup language compliant pages 50 are stored on and are executable on the server 24, and are accessible through the Internet connection 28. Actually, only one hypertext markup language compliant page 50 is necessary, but this wold represent a very limited version of the lubricant evaluation software 30. The hypertext markup language compliant pages 50 display output generated by the lubricant evaluation software 30, such as test results 60 of lubricant samples 62.

The hypertext markup language compliant pages 50 have an embedded function 52 displayed on the page. In the preferred embodiment illustrated, the embedded function 52 comprises a plurality of embedded functions 52. These embedded functions 52 appear on the page typically as buttons, pull-down menus, spreadsheet cells, and the like, and preferably appear as one or perhaps a few buttons 52a, pull-down menus 52b, and/or spreadsheet cells 52c, and so on, on most of the hypertext markup language compliant pages 50. In this above described manner, the hypertext markup language compliant pages 50 are operable to facilitate data communications related to the lubricant evaluation software 30 over the Internet 21 between the server 24 and each client 40 who is using a remote computer 56 that is non-local from the application service provider 22. Typically, the remote computer 56 is on the premises of one of said plurality of clients 40, but may also may be elsewhere.

As can be seen in several of the Figures, the embedded functions 52 are operable to run at the server 24, when an Internet browser 54 running on one of the remote computers 56 accesses the hypertext markup language compliant page 50. The embedded functions 52 are selected, to thereby permit selected access by clients 40 using an Internet browser 54 to the lubricant evaluation software 30, in order to access the lubricant related data 32.

Figure 20:
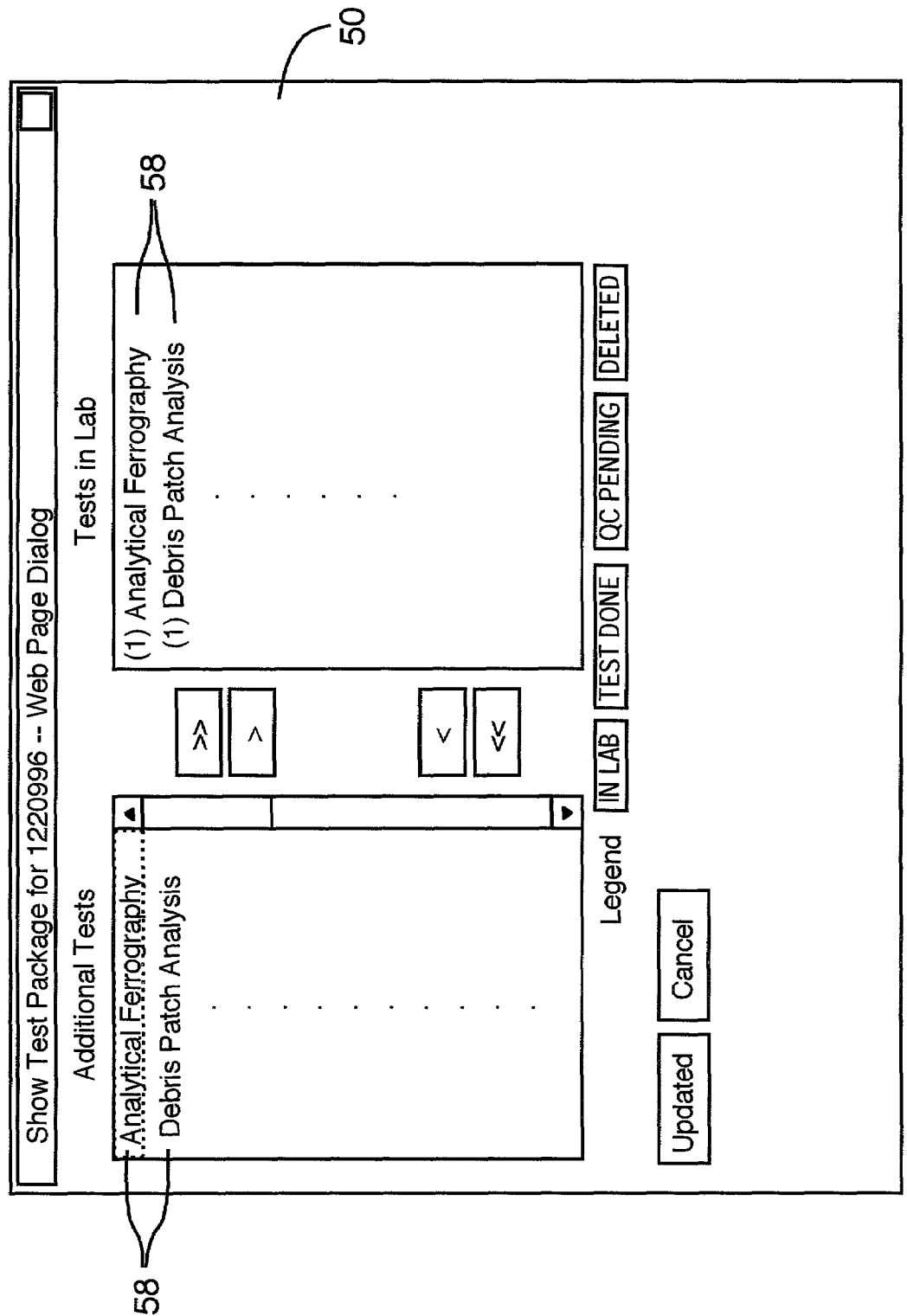
FIG. 20 is a computer screen printout of laboratory test packages that are selectable via hypertext markup language compliant pages on the Internet-based lubricant evaluation and reporting system of FIG. 1.

The lubricant evaluation software 30 comprises a plurality of laboratory test packages 58 available to clients 40, which laboratory test packages 58 are selectable by clients 40 via the hypertext markup language compliant page 50, as can be best seen in FIG. 20. Further, the lubricant evaluation software 30 permits the clients 40 to record and indicate the priority of the lubricant test results 60 of the lubricant samples 62.

The lubricant related data 32 comprises laboratory derived lubricant test results 60 of lubricant samples 62 that have been tested in a laboratory 64 that is either on the premises of the oil analysis company, or is remote from the oil analysis company and transmits test results 60 from the laboratory's computer system 57 to the server 24 of the oil analysis company via the Internet 21, or perhaps via a private or virtual private network. Using the Sample Search box 51 on a hypertext markup language compliant page 50, (see FIG. 5), clients 40, industry associates 42, and lubricant test laboratories 64 can access lubricant test results 60 of lubricant samples, as desired.

Such analysis of oil and other lubricants checks for the existence of levels of foreign particles in the oil and lubricants, such as wear particles, including iron, chromium, nickel, titanium, silver, aluminum, lead, copper, and tin, and contaminants including silicon, sodium, potassium, fuel, water, glycol, soot, nitration, and sulfation. Also checked for are oil additives such as boron, barium, molybdenum, magnesium, calcium, phosphorus, zinc, sulfur, and sodium. Also, screening processes are used to check for white metal, babbitt, precipitate, silt, debris, and dirt. As can be best seen in FIG. 6, the levels of various particles, additives, contaminants, and the like, are shown on a hypertext markup language compliant page 50.

Figure 7:
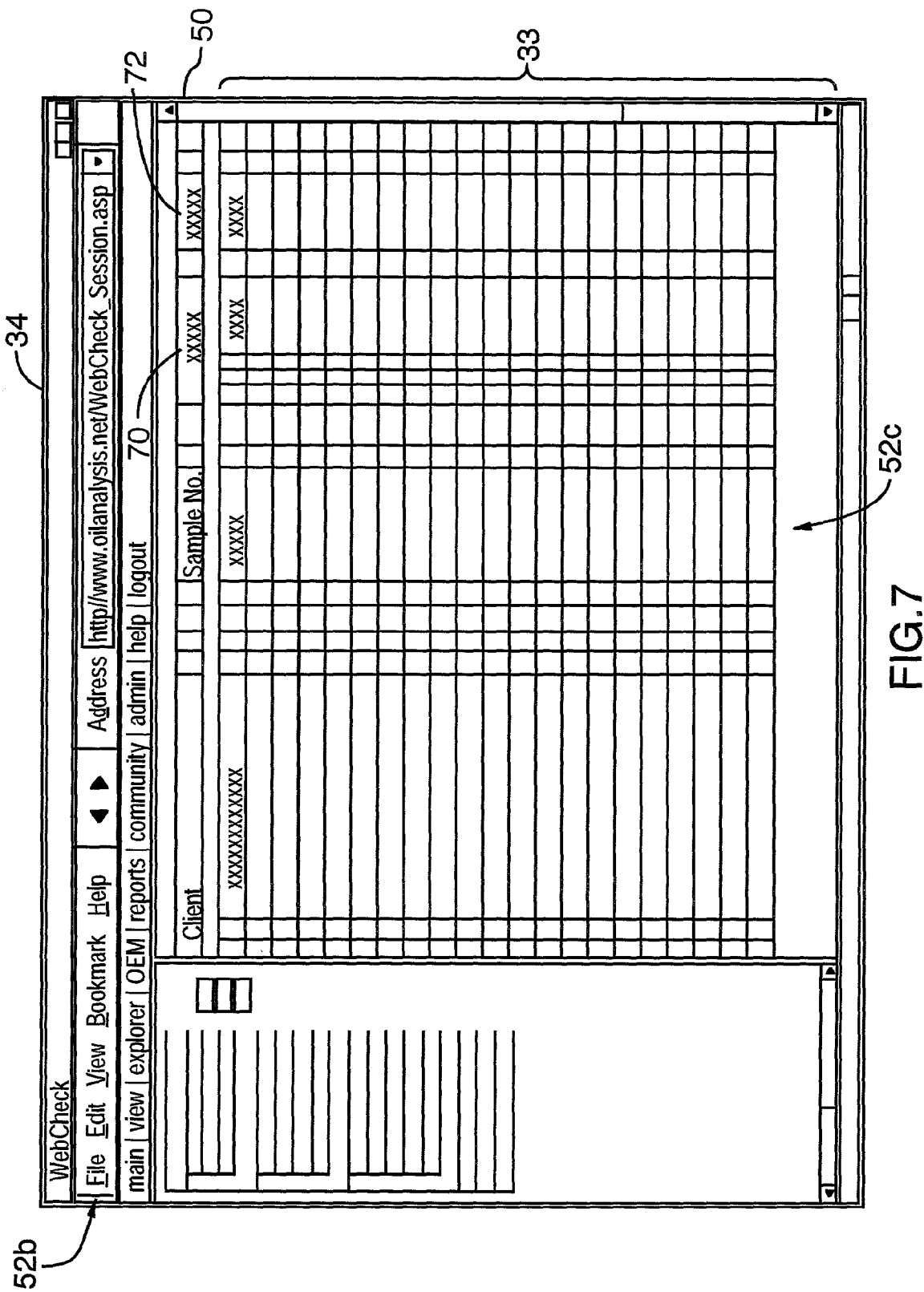
FIG. 7 is a computer screen printout of Internet-based lubricant evaluation and reporting system of FIG. 1.
Figure 8:
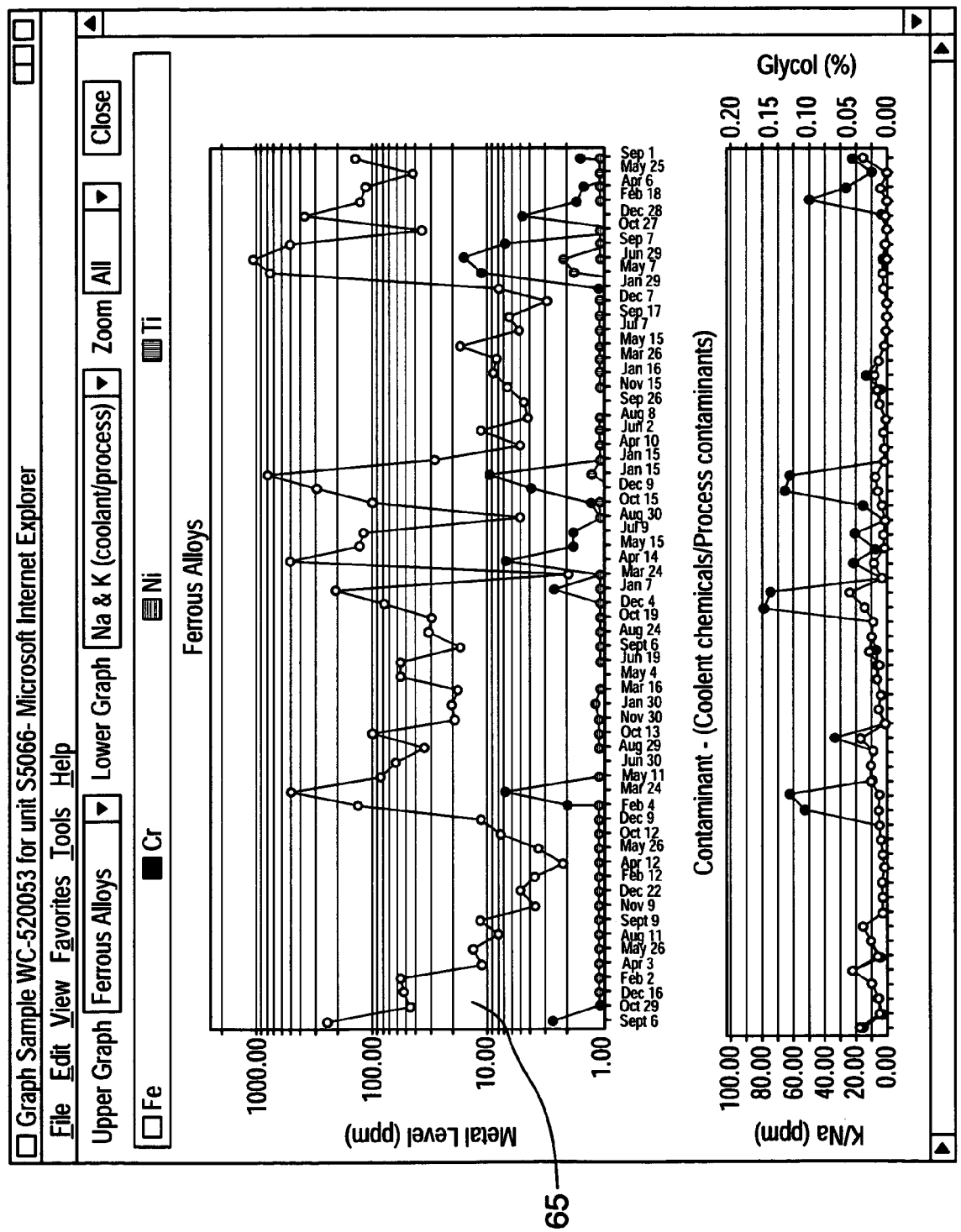
FIG. 8 is a computer screen printout of a graph representing part of lubricant related data administered by the lubricant evaluation software of the Internet-based lubricant evaluation and reporting system of FIG. 1.

A general sample results screen, as shown in FIG. 7 and known as an Explorer screen, is used to show lubricant test results. The lubricant related data 32 indicates the specific unit 70, which unit may be a machine, a piece of equipment, or a vehicle, and the sampling point 72, which may be an engine, a gearbox, and so on, on the unit 70, from which the lubricant samples 62 were taken. The lubricant related data 32 comprises information related to lubricant test criteria, so that the client can properly relate to and understand the significance of the lubricant related data 32, specifically the lubricant test results 60. Some of the lubricant related data 32 may even be represented in a graph 65 as shown in FIG. 8.

Figure 9:
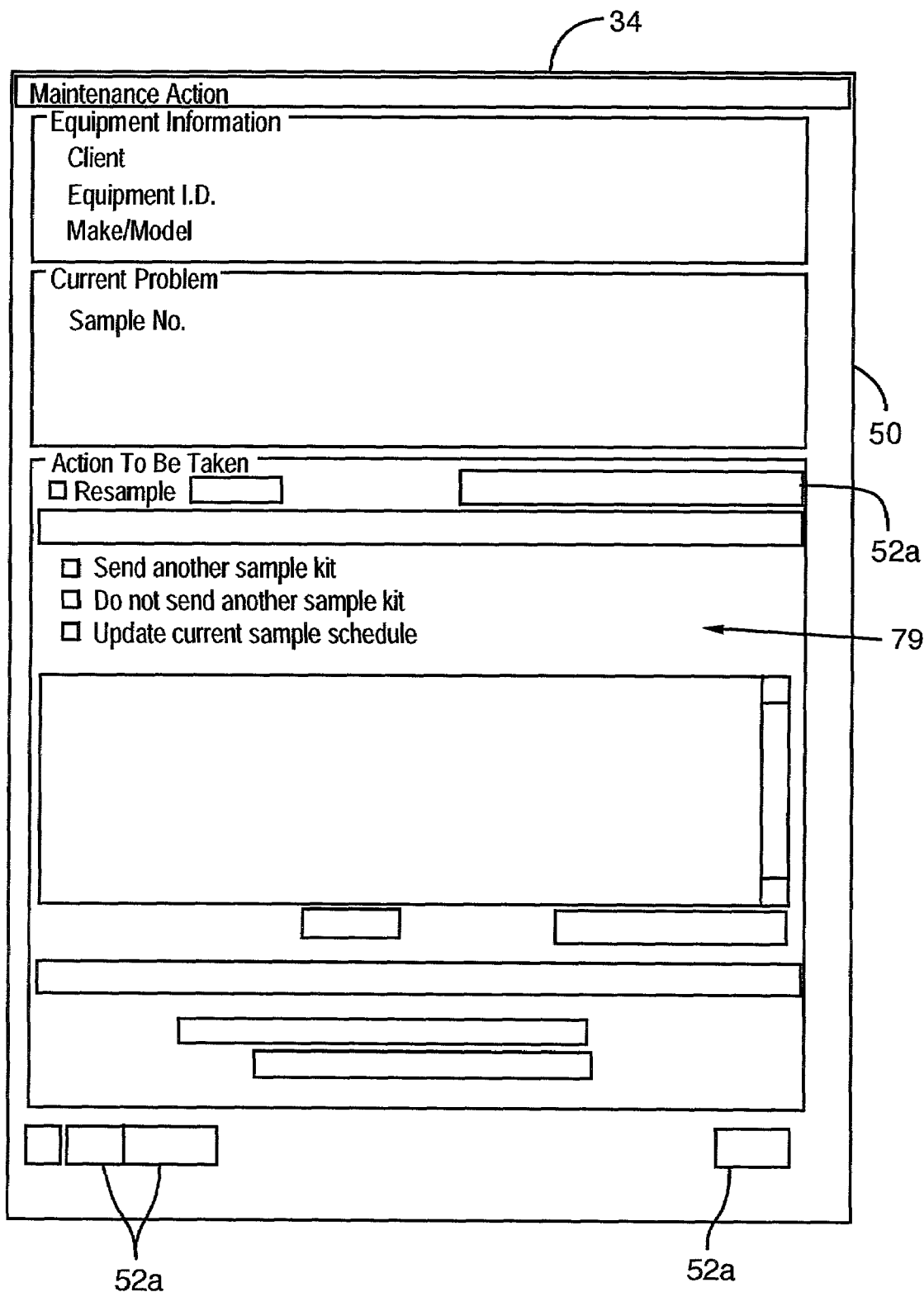
FIG. 9 is a computer screen printout of a maintenance action dialog of the Internet-based lubricant evaluation and reporting system of FIG. 1.

Subsequent to lubricant tests being performed, a customer can call up on their remote computer 56 a Maintenance Action screen, as is best shown in FIG. 9. Via this Maintenance Action screen, a customer can receive information regarding lubrication results and problems related thereto, and also can choose whether to send another sample kit or not, and whether to update the current sample schedule, as indicated by general reference numeral 79.

Figure 10:
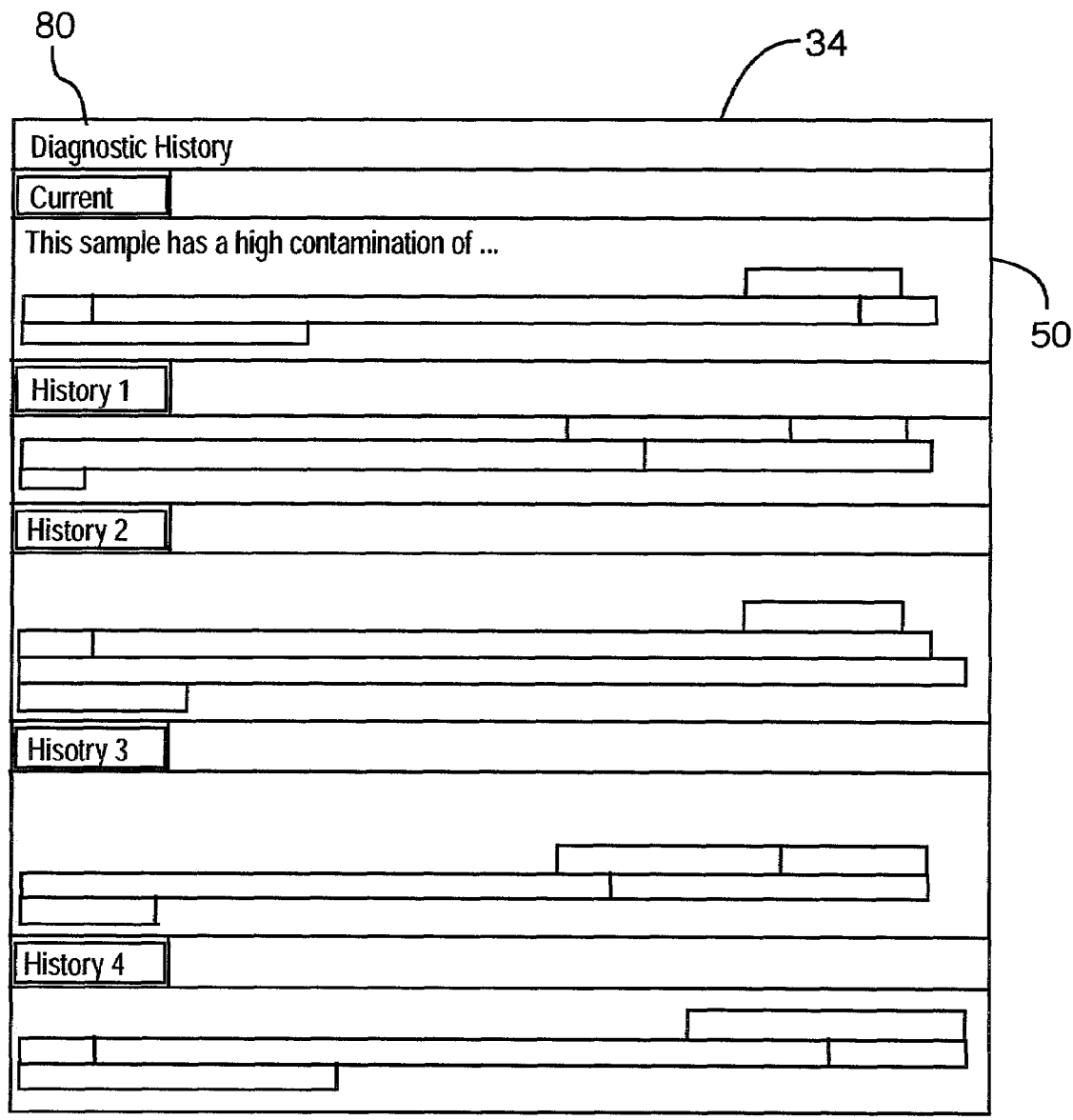
FIG. 10 is a computer screen printout a diagnostic history window of the Internet-based lubricant evaluation and reporting system of FIG. 1.

As can be best seen in FIG. 10, the lubricant evaluation software 30 compiles a diagnostic history 80 for each sampling point 72 and specific unit 70 from which the lubricant samples 62 were taken. The diagnostic history 80 is part of a performance record database of sampling points and specific units, and lubricants. The performance record database is part of the database of lubricant related data 32, and provides an indication over a period of time of problems with a machine, piece of equipment, or vehicle, and effectiveness of lubricants.

The data on the database of lubricant related data 32 comprises records 33 uniquely related to each of the plurality of clients 40 of the oil analysis company. The records 33 for each client are separate and distinct from the records 33 for each other client, as dictated by the structure of the database. Further, as is well known, each client's unique records 33 are accessible only through use of a password or passwords. The lubricant evaluation software 30 includes software executable on the server 24 for receiving input from each one of the plurality of clients 40, and for permitting each of the plurality of clients 40 to access its own uniquely related records 33 in the database trough the use of such passwords. The lubricant evaluation software 30 also includes software executable on the server 24 for selectively transmitting data from the server 24 to each of the plurality of clients 40, such as by e-mail 82 or by facsimile 84 over telephone line 85.

Figure 11:
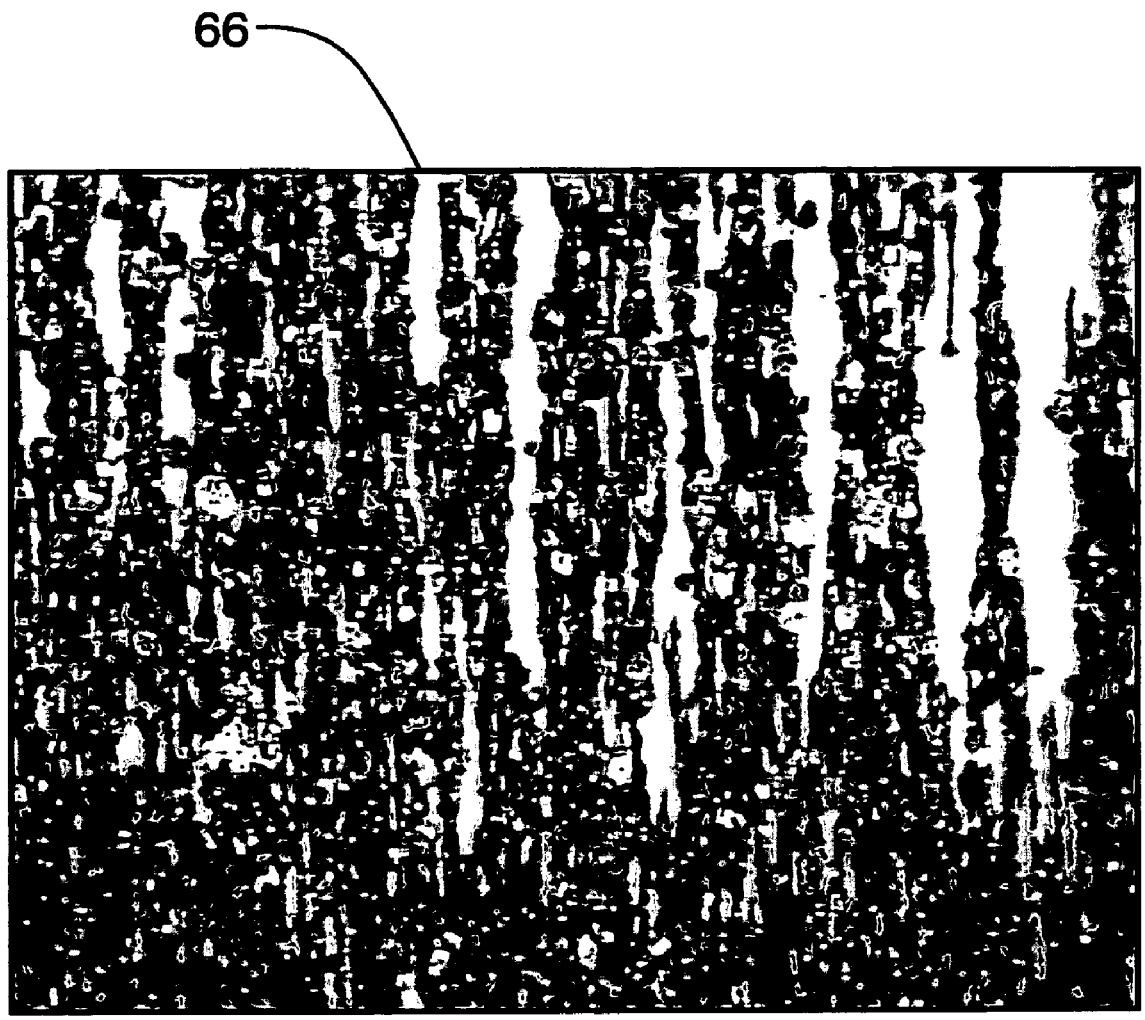
FIG. 11 is a photographic representation of a digitally encoded image related to the lubricant test results in the database of lubricant related data, within the Internet-based lubricant evaluation and reporting system of FIG. 1.

Also, the database of lubricant related data 32 preferably includes digitally encoded images 66 related to the lubricant test results 60, as can be best seen in FIG. 11. These digitally encoded images 66 permit a client's technical personnel to view specific test results 60 "first hand", as if the technical personnel had actual access to a microscopes in the laboratory 64.

Another important feature of the preferred embodiment Internet-based lubricant evaluation and reporting system 20 of the present invention is that the lubricant evaluation software 30 precludes each of the plurality of clients 40 from accessing the records 33 in the database of each other client, typically by means of the passwords discussed above. In the preferred embodiment, the software that selectively precludes each of the plurality of clients 40 from accessing the records 33 in the database of each other client permits each client to specify which other clients 40 may have access to the specifying client's uniquely related records 33, and which other clients 40 do not have access to the specifying client's uniquely related records 33. In this manner, two or more companies who are co-operating with regards to perhaps maintenance problems with a specific model of machine, equipment, or vehicle, can readily share relevant data. Further, the software for selectively precluding each of the plurality of clients 40 from accessing the records 33 in the database of each other client also permits each client to specify which industry associates 42 have access to the specifying client's uniquely related records 33, thereby allowing industry associates 42, such as original equipment manufacturers 44, suppliers of lubricants 46, and industry consultants 48, to assist with lubricant analysis problems, maintenance problems and programs, and so on. More specifically, website addresses 43 related to the industry associates 42 are stored by the server 24 and are made available by the server 24 to thereby permit the clients 40 access to hypertext markup language compliant pages 50 related to the industry associates 42. In the preferred embodiment Internet-based lubricant evaluation and reporting system 20, the industry associates 42 have regulated access to sampling records, test result records, and maintenance records, all retrievably stored within the database of lubricant related data 32.

Figure 16:
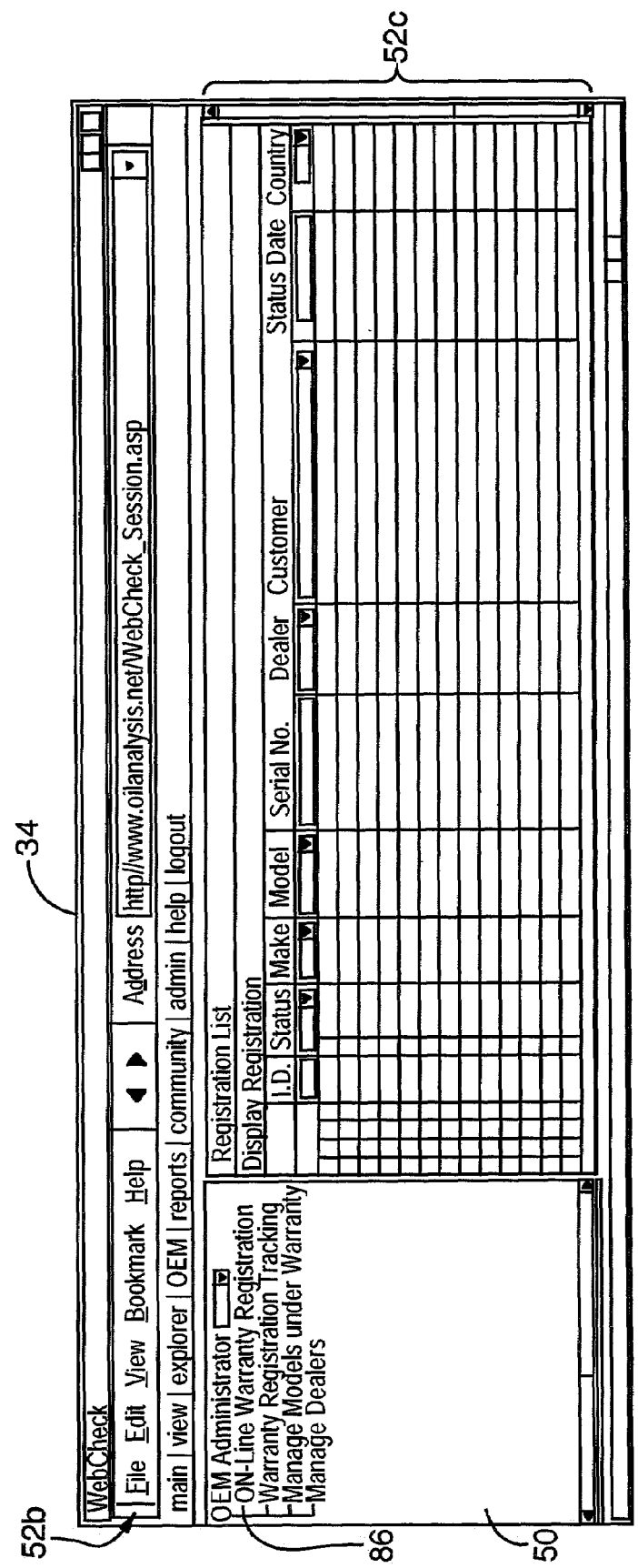
FIG. 16 is a computer screen printout of a warranty tracking page of the Internet-based lubricant evaluation and reporting system of FIG. 1.
Figure 17:
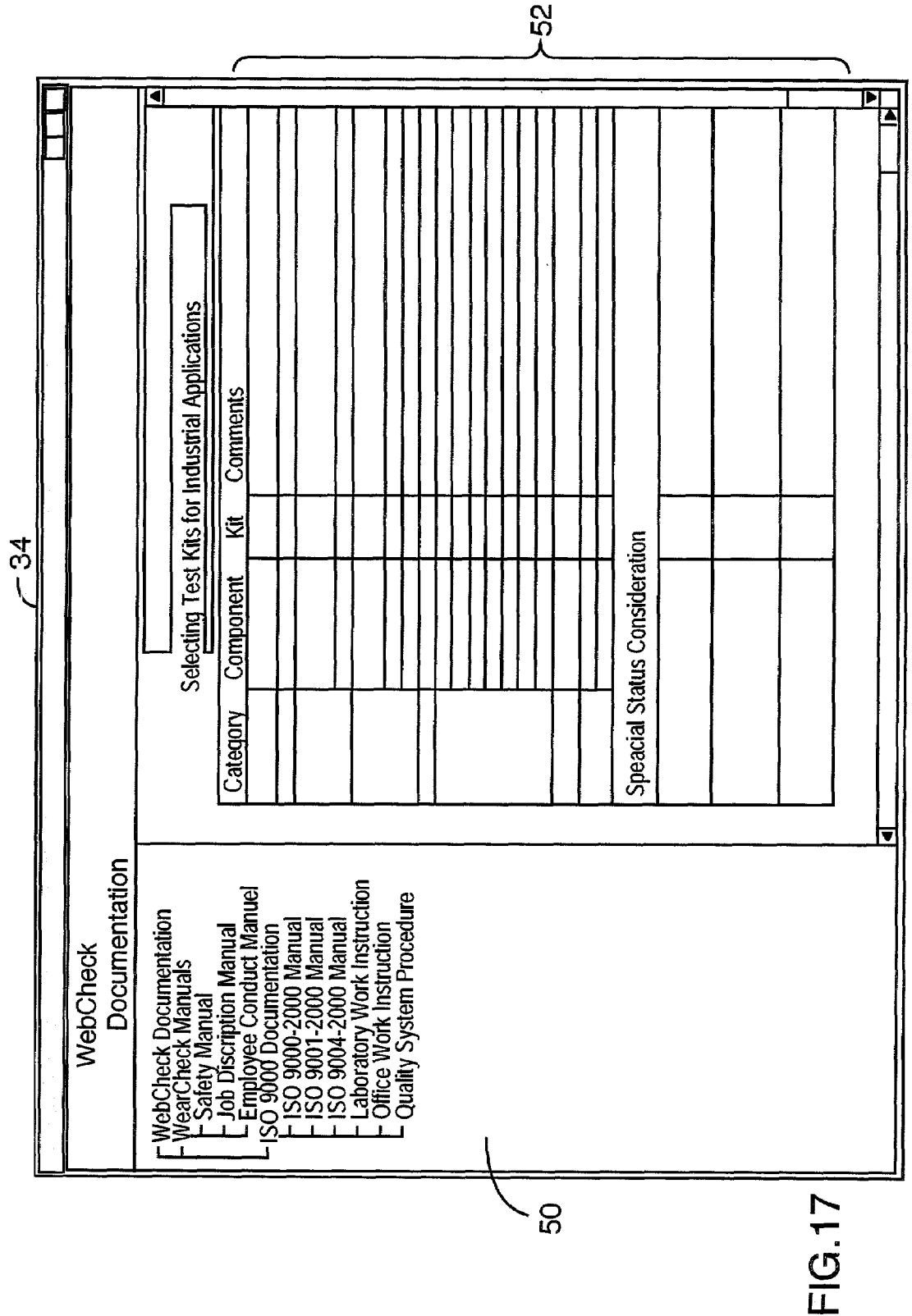
FIG. 17 is a computer screen printout of a test kit selection page of the Internet-based lubricant evaluation and reporting system of FIG. 1.

Another notable feature of the preferred embodiment Internet-based lubricant evaluation and reporting system 20 of the present invention is that the lubricant evaluation software 30 permits portions of the lubricant related data 32 pertaining to equipment warranties 86, as can be best seen in FIG. 16, to be communicated via the Internet 21 to the industry associates 42 for warranty tracking purposes.

Figure 12:
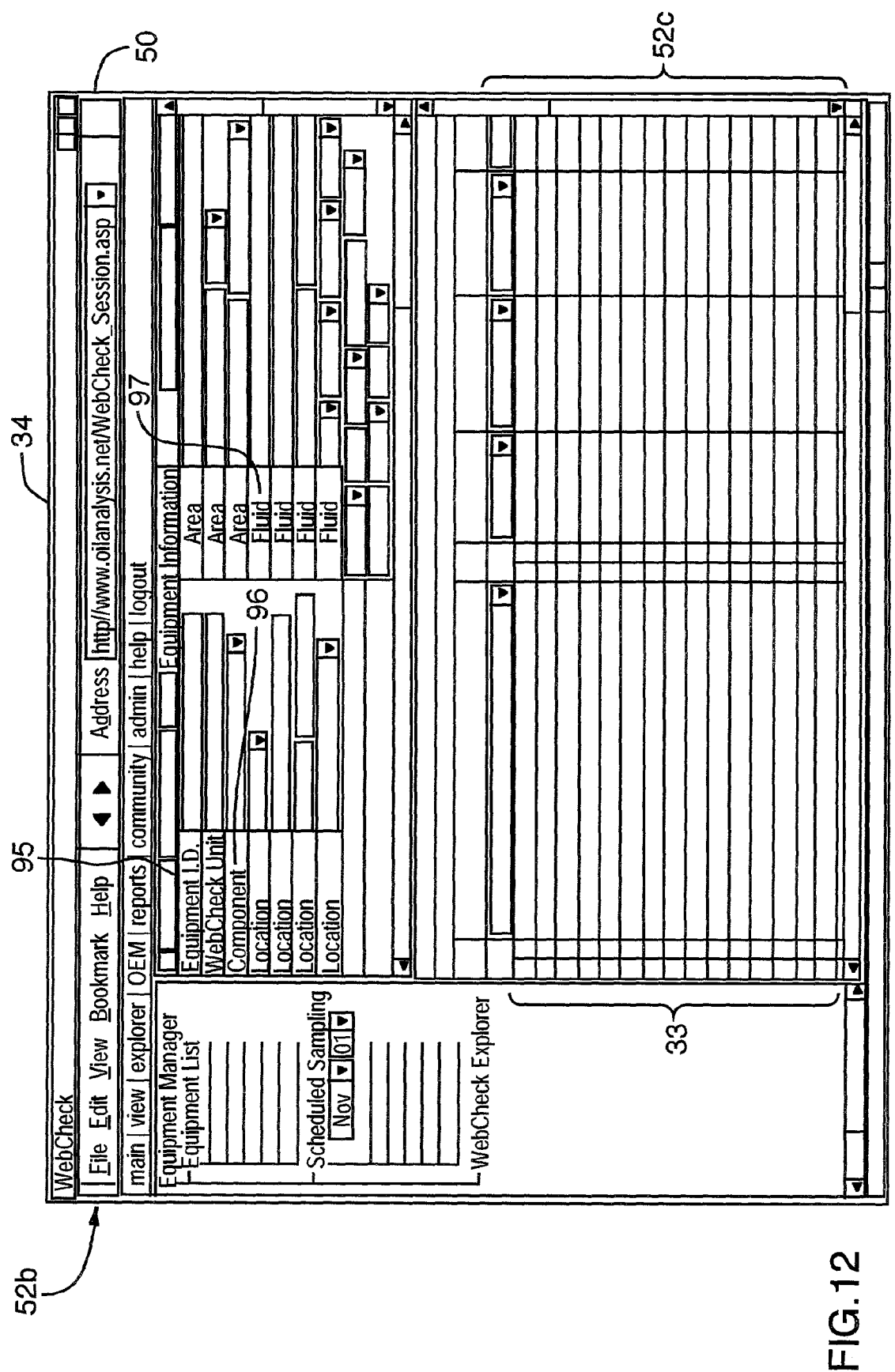
FIG. 12 is a computer screen printout of an equipment manager window of the Internet-based lubricant evaluation and reporting system of FIG. 1.

In order to permit clients 40 to conveniently and advantageously use lubricant test results 60, the lubricant evaluation software 30 permits the clients 40 to search for data within their own uniquely related records 33 in various ways. For instance, as can be best seen in FIGS. 5 and 14, the lubricant evaluation software 30 permits the clients 40 to search for data within their own uniquely related records 33 by means of a lubricant sample date 90, by means of boolean logic 92, and by means of a lubricant sample reference number 94. Additionally, FIG. 12 shows an Equipment Manager Menu that permits a client 40, or other user, to review all their uniquely related records 33 within the database of lubricant related data 32. As shown, these uniquely related records 33 may be accessed by the Equipment I.D. 95, the specific component(s) 96 that the lubricant is taken from, the type of lubricant 97, and so on.

The lubricant evaluation software 30 permits selection of one or more of the plurality of lubricant test laboratories by the clients 40, thus ensuring that a client can use a preferred laboratory 64, such as a conveniently located laboratory 64 or a laboratory 64 that performs certain types of tests, and so on. The lubricant evaluation software 30 also provides regulated access by the lubricant test laboratories to the database of lubricant related data 32, specifically to client's uniquely related records 33, as selected by each client 40.

Figure 13:
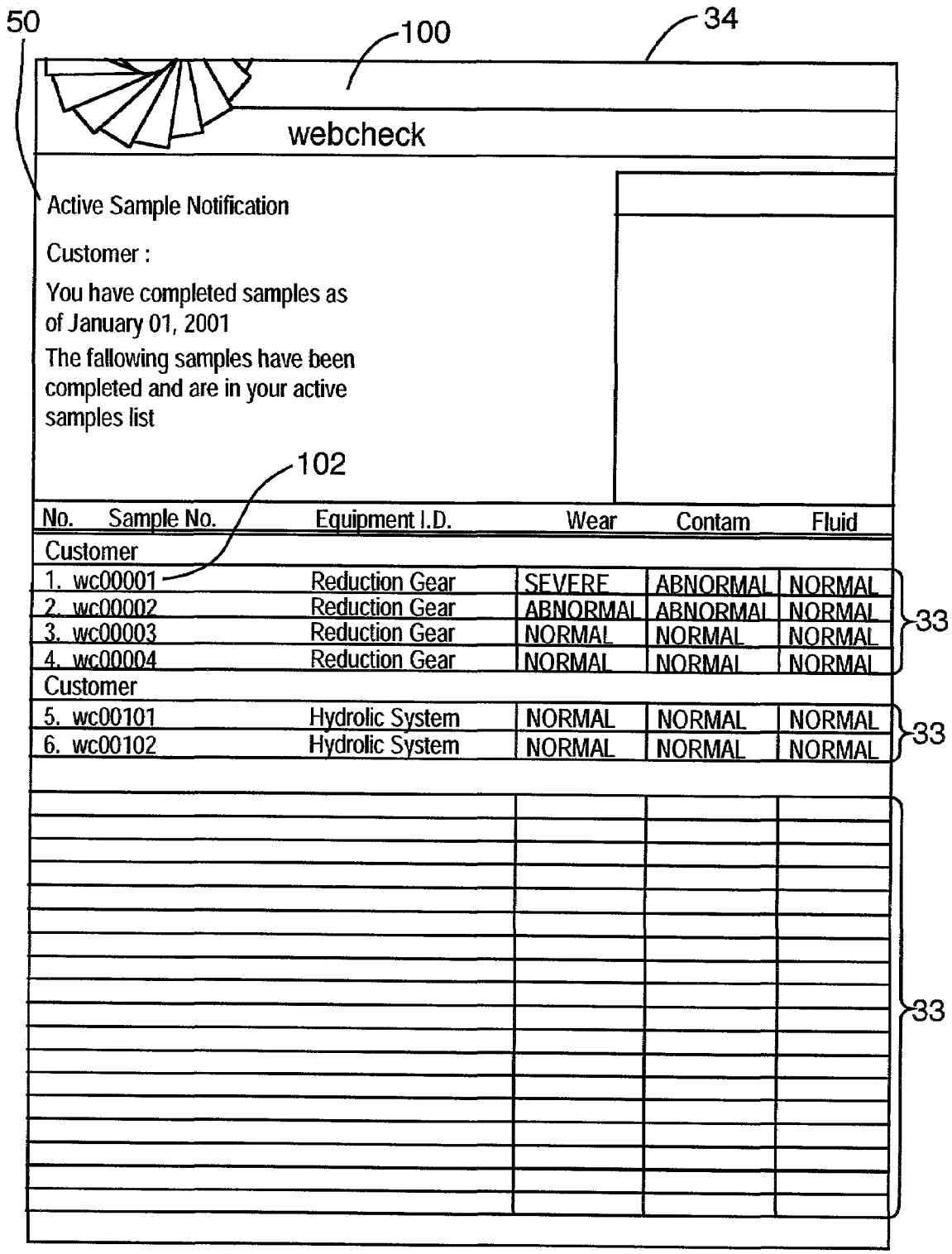
FIG. 13 is a computer screen printout of reports generated by the Internet-based lubricant evaluation and reporting system of FIG. 1.

The lubricant evaluation software 30 also comprises report generation software 100 executable on the server 24 for generating reports 102 for each of the plurality of clients 40, as can be best seen in FIG. 13. The reports 102 are selectable and their output format is tailorable by the clients 40, in order to best meet a client's needs, and may be previewed on the screen of the remote computer 56. As shown, the client is a laboratory or a lubricant management company, or the like, that has several customers. In this manner, important parts of the reports 102 may be seen immediately, especially problem areas. Problems such as a severe test parameter, can be displayed in a readily noticeable color, such as red. The reports 102 can be transmitted to each of the plurality of clients 40 via the Internet 21, either automatically, or as selected by the client, or alternatively, the reports 102 can be transmitted to clients 40 via e-mail 82 or facsimile 84.

During the laboratory testing procedure, the reports 102 are automatically generated during laboratory processing of the lubricant samples 62, as the lubricant samples 62 progress through various stages of the laboratory processing. In this manner, reports 102 can be ready for previewing by a client 40 or for forwarding to a client 40 immediately after laboratory testing is finished.

The lubricant evaluation software 30 also includes industry standard data 110 related to lubricants, such as typical levels of contaminants, so that a client 40 can readily and accurately compare the test results 60 of the lubricant samples 62 to the industry standard data. Accordingly, the reports 102 would typically include reference to the industry standard data, as can be best seen in FIG. 18.

Figure 14:
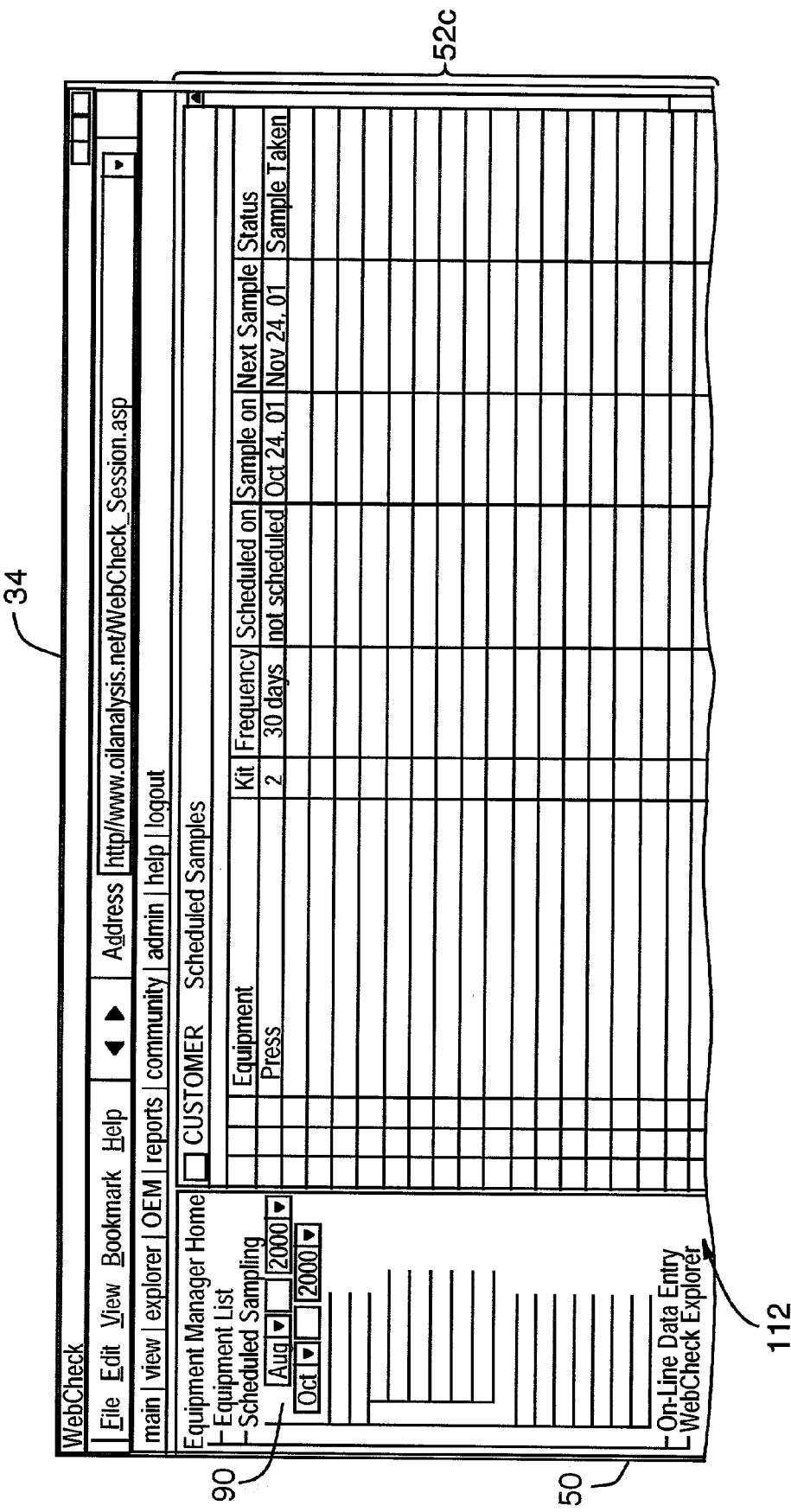
FIG. 14 is a partial computer screen printout of a sampling schedule of the Internet-based lubricant evaluation and reporting system of FIG. 1.
Figure 15:
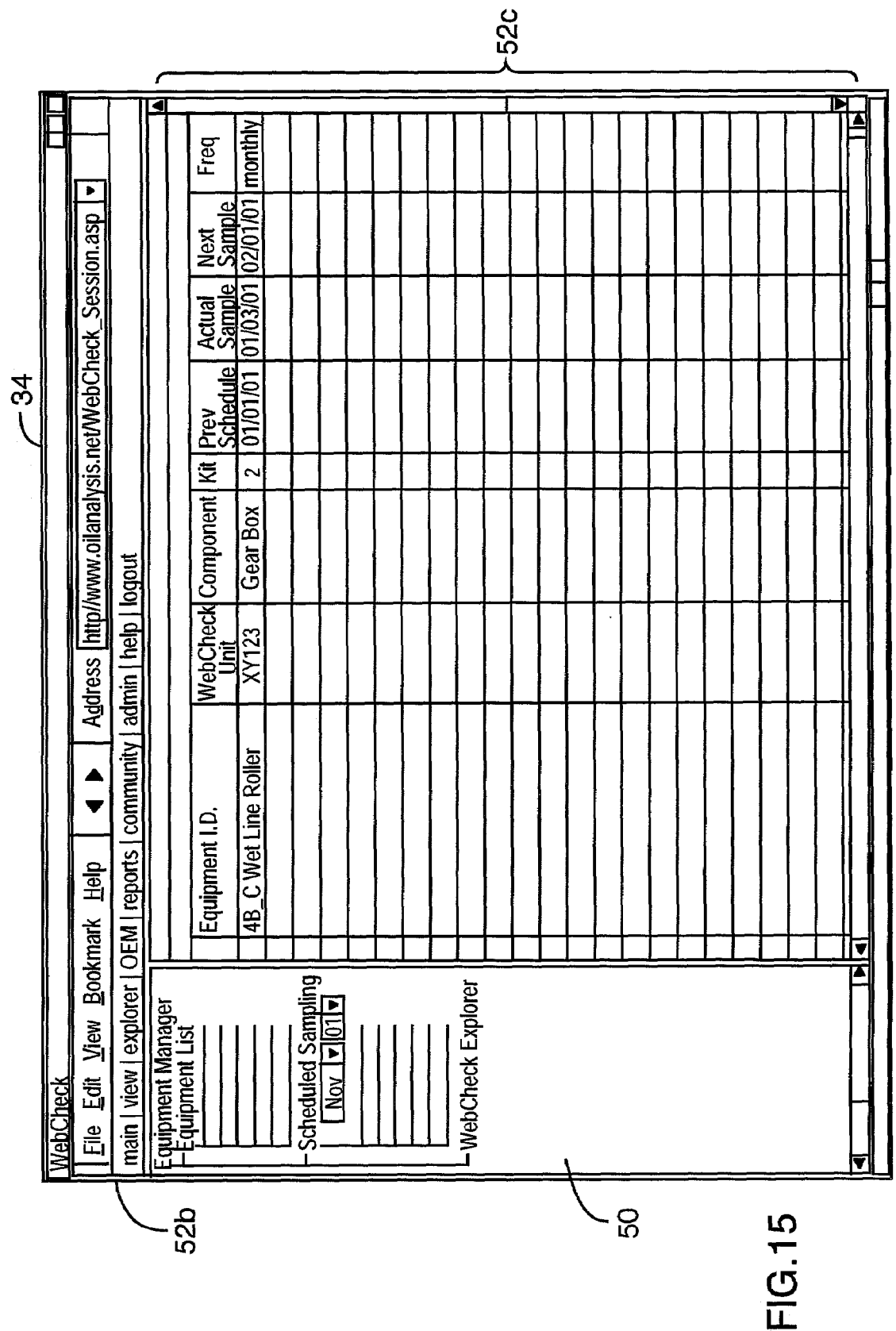
FIG. 15 is a computer screen printout of a scheduled sampling window of the Internet-based lubricant evaluation and reporting system of FIG. 1.

Preferably, the lubricant evaluation software 30 also comprises equipment sampling schedules 112 for the clients 40, which equipment sampling schedules are available to the clients 40 via the Internet 21, as shown in FIGS. 14 and 15. The Equipment I.D. 95, the specific component(s) 96 that the lubricant is taken from, the sampling kit 98, and sampling information such as the previously scheduled sampling data 99a, the actual sampling data 99b, the next scheduled sampling data 99c, and the sampling frequency 99d, are shown. The lubricant evaluation software 30 permits modification of the equipment sampling schedules by the clients 40 via the Internet 21. If selected by the client, the equipment sampling schedules 112 may be automatically transmitted to the clients 40 via e-mail 82 or facsimile 84, so that the client receives a current equipment sampling schedule 112, perhaps every day or every week, as specified by the client via the lubricant evaluation software 30. The lubricant evaluation software 30 also permits just-in-time ordering of lubricant sampling kits 114 for delivery to clients 40, to coincide with the client's equipment sampling schedule 112, as can be best seen in FIG. 17.

The lubricant evaluation software 30 permits maintenance reminders 120 related to the uniquely related records 33 of a particular client 40 to be generated and sent to the particular client 40, for reminding the particular client 40 of maintenance dates and functions. The maintenance reminders 120 may include the above discussed lubrication reminders, and may be automatically transmitted to clients 40 via e-mail 82 or facsimile 84. Also, the maintenance reminders 120 related to the uniquely related records 33 of a particular client 40 may be displayed on the hypertext markup language compliant page 50 when the particular client 40 logs onto the server 24, to thereby ensure that personnel directly involved in a client's lubricant analysis program see the maintenance reminders 120.

Figure 19:
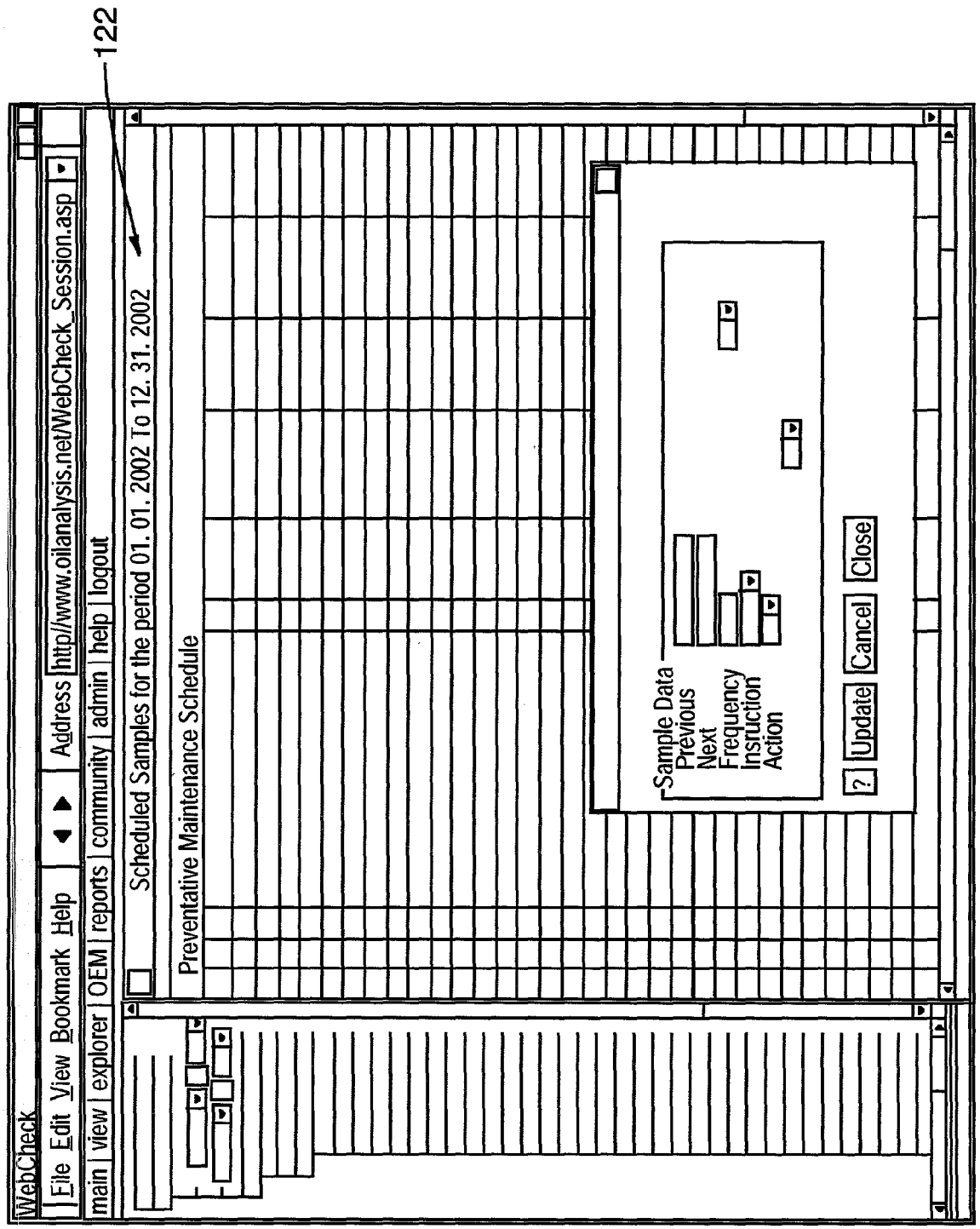
FIG. 19 is a computer screen printout of a pro-active maintenance schedule generated by the Internet-based lubricant evaluation and reporting system of FIG. 1.

The lubricant evaluation software 30 generates pro-active maintenance schedules 122, as can be best seen in FIG. 19, related to the lubricant test results 60 and the industry standard data 110. In other words, problems with machines, equipment, and vehicles, can be detected early, at least to some extent, through the use of the appropriate laboratory test results 60 and lubricant related data 32. The problem can then be fixed before failure of the machine, equipment, or vehicle occurs. The pro-active maintenance schedules 122 related to a client's own uniquely related records 33 can be modified by the client 40 through the lubricant evaluation software 30. The lubricant evaluation software 30 also permits entry by the clients 40 of maintenance schedules and maintenance tracking data, and permits the clients 40 to enter data related to performed maintenance, to thereby generate maintenance records 33 on the database of lubricant related data 32. It has been found that many smaller clients 40 do not have computer based systems for tracking maintenance and generating and storing maintenance records. The present invention makes such a system available over the Internet on a cost effective basis.

Figure 21:
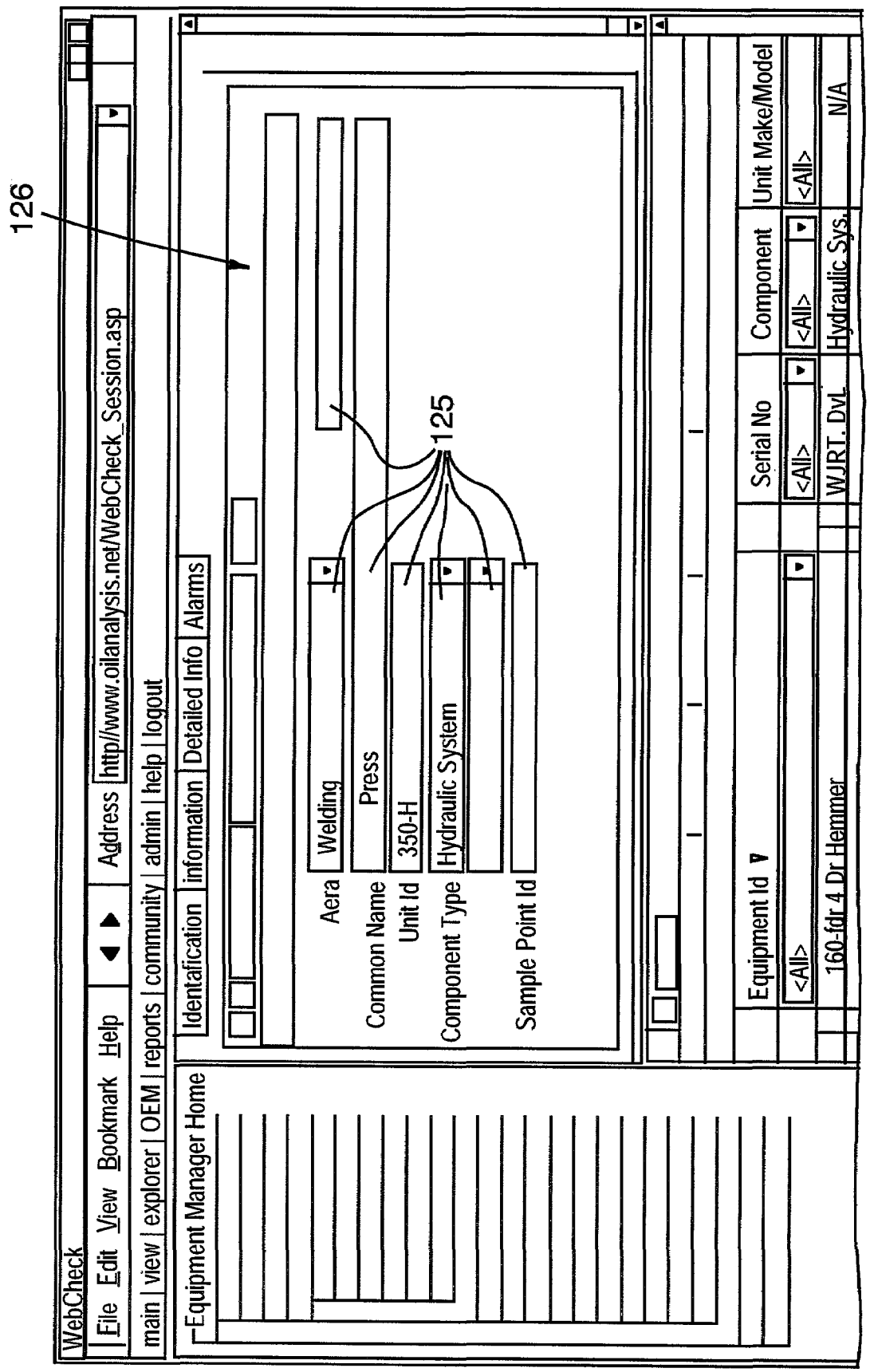
FIG. 21 is a partial computer screen printout of a lubrication survey page of the Internet-based lubricant evaluation and reporting system of FIG. 1; and, FIG. 22 is a partial computer screen printout of a technical data page of the Internet-based lubricant evaluation and reporting system of FIG. 1; and, FIG. 23 is a partial computer screen printout of an OEM module of the Internet-based lubricant evaluation and reporting system of FIG. 1.
Figure 22:
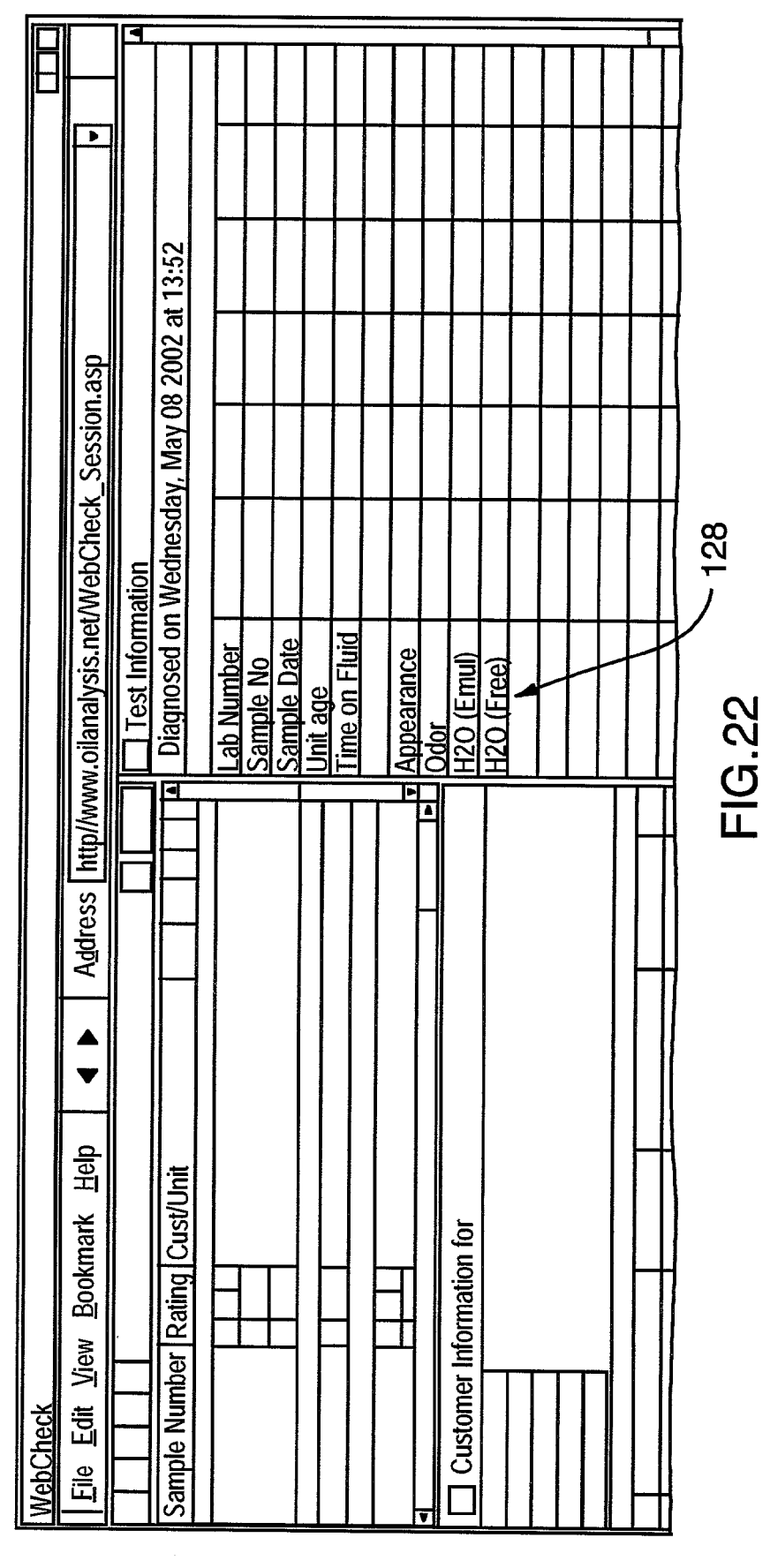

As can be best seen in FIG. 21, the lubricant evaluation software 30 also comprises a lubrication survey 126 addressable by the clients 40. On the lubrication survey screen, a client can enter information in data entry windows 125 about a piece of equipment that will have its lubricant's testing administered by and its test results monitored by the Internet-based lubricant evaluation and reporting system 20. Further, the lubricant evaluation software 30 permits the merging of technical data, as indicated by the general reference numeral 126, related to vibration analysis equipment readings, thermography equipment readings, and ultrasonic equipment readings, as can be best seen in FIG. 22, with the data from the more conventional laboratory derived lubricant test results 60 of lubricant samples 62, as discussed above.

Figure 23:
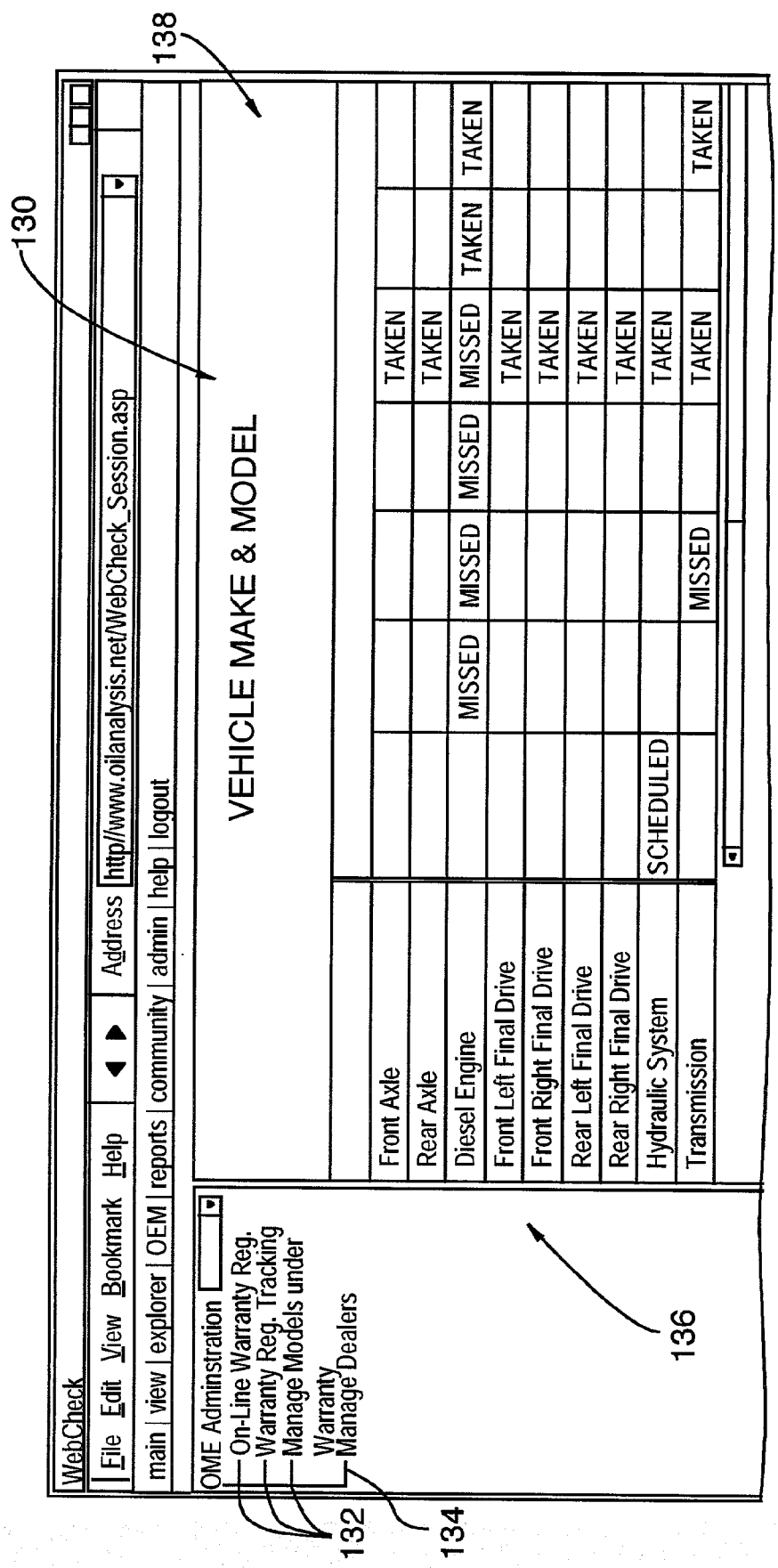

Reference will now be made to FIG. 23 which shows a computer screen printout of an OEM (original equipment manufacturer) module of the Internet-based lubricant evaluation and reporting system 20 of the present invention. This OEM module permits original equipment manufacturers to manage their oil analysis programs. Original equipment manufacturers can register a new make and/or model of equipment, as indicated by general reference numeral 130, can enter and access warranty information 132, dealer information 134, customer information, and information about their equipment's various components that use lubrication, as indicated by general reference numeral 136. They can also enter information such as serial numbers, the length of a warranty of specific equipment, and so on.

The Internet-based lubricant evaluation and reporting system 20 of the present invention uses this information to generate packing slips including those for the first 1,000 hours worth of lubrication sample kits.

The Internet-based lubricant evaluation and reporting system 20 tracks samples that are returned to the lubricant test laboratory 64 and compiles data related to specific makes and models of equipment. The original equipment manufacturer can log onto the Internet-based lubricant evaluation and reporting system 20 through the Internet 21 in order access lubricant test results. More specifically, original equipment manufacturers can check on the current status of the samples that were analysed and the historical status of the samples that were analysed and therefore check on the current status and historical status of the machine that these samples were taken from, as indicated by general reference numeral 138. In this manner, an original equipment manufacturer can monitor various lubricant-related characteristics of its makes and models of equipment, and can build a database of lubrication characteristics and problems with various components of a piece of equipment or machinery.

As can be understood from the above description and from the accompanying drawings, the present invention provides an Internet-based lubricant evaluation and reporting system that has standardized tests; wherein the lubricant test result information can be shared between various locations of a client's company; wherein lubricant analysis data is shared between clients, lubricant suppliers, original equipment manufacturers, and industry consultants; wherein lubricant analysis data is used to determine various characteristics of machinery, equipment, and vehicles; having a common platform, namely the Internet, available to oil analysis companies and their clients, and to the industry in general; wherein common industry standards for data exchange are used; wherein clients can readily switch from one laboratory to another without loss of lubricant analysis data and use thereof; and that is used to enhance the effectiveness of a maintenance program of machinery, equipment, and vehicles, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the Internet-based lubricant evaluation and reporting system of the present invention without departing from the spirit and scope of the accompanying claims.

I claim:

1. An Internet-based lubricant evaluation and reporting system comprising:

an application service provider;

a server operable by said application service provider, said server including an operating control system, an Internet connection and lubricant evaluation software executable on said control system to administer a database of lubricant related data;

a client connected over the Internet to said application service provider, by an Internet browser running on a remote computer non-local from said application service provider, to thereby facilitate communications related to the use of said lubricant evaluation software over said Internet between said server and said client; and a hypertext markup language compliant page on said server and accessible through said Internet connection, said hypertext markup language compliant page displaying output generated by said lubricant evaluation software and having an embedded function displayed on said page and operable to facilitate said communications related to the use of said lubricant evaluation software over the Internet between said server and said client;

wherein said embedded function is operable to run at said server, when said Internet browser running on said remote computer accesses said hypertext markup language compliant page, and said embedded function is selected, to thereby permit selected access by said client using said Internet browser to said lubricant evaluation software, in order to access said lubricant related data;

wherein said Internet-based lubricant evaluation and reporting system further comprises a plurality of clients connected over the Internet to said application service provider, by a respective Internet browser running on a respective remote computer non-local from said application service provider, to thereby facilitate communications related to the use of said lubricant evaluation software over said Internet between said server and said clients;

wherein said data on said database comprises records uniquely related to each of said plurality of clients, the records for each client being separate and distinct from the records for each other client;

wherein said lubricant evaluation software permits each of said plurality of clients to access its own uniquely related records in said database, and selectively precludes each of said plurality of clients from accessing the records in said database of each other client; and wherein said lubricant evaluation software permits said clients to search for data within their own uniquely related records by means of a lubricant sample date.

2. The Internet-based lubricant evaluation and reporting system of claim 1, wherein said communications related to said lubricant evaluation software comprise data communications.

3. The Internet-based lubricant evaluation and reporting system according to claim 2, wherein said lubricant related data comprises laboratory derived lubricant test results of lubricant samples.

4. The Internet-based lubricant evaluation and reporting system according to claim 3, wherein said lubricant related data indicate the specific unit and the sampling point from which said lubricant samples were taken.

5. The Internet-based lubricant evaluation and reporting system according to claim 4, wherein said lubricant related data comprises information related to lubricant test criteria.

6. The Internet-based lubricant evaluation and reporting system according to claim 5, wherein said database of lubricant related data includes digitally encoded images related to said lubricant test results.

7. The Internet-based lubricant evaluation and reporting system according to claim 6, wherein said embedded function comprises a plurality of embedded functions.

8. The Internet-based lubricant evaluation and reporting system according to claim 7, wherein said lubricant evaluation software permits each of said plurality of clients to perform data entry through said Internet connection.

9. The Internet-based lubricant evaluation and reporting system according to claim 8, with said system further comprising software executable on said server for receiving input from said plurality of clients, and software executable on said server for selectively transmitting data from the server to said plurality of clients.

10. The Internet-based lubricant evaluation and reporting system of claim 9, wherein said software for selectively precluding each of said plurality of clients from accessing the records in said database of each other client, also permits each client to specify which other clients have access to the specifying client's uniquely related records.

11. The Internet-based lubricant evaluation and reporting system of claim 10, further comprising an industry associate connected over the Internet to said application service provider, by an Internet browser running on a remote computer non-local from said application service provider, to thereby facilitate communications related to the use of said lubricant evaluation software over said Internet between said server and said industry associate.

12. The Internet-based lubricant evaluation and reporting system according to claim 11, further comprising a plurality of industry associates, each industry associate connected over the Internet to said application service provider, by an Internet browser running on a remote computer non-local from said application service provider, to thereby facilitate communications related to the use of said lubricant evaluation software over said Internet between said server and said industry associates.

13. The Internet-based lubricant evaluation and reporting system of claim 12, wherein said software for selectively precluding each of said plurality of clients from accessing the records in said database of each other client, also permits each client to specify which of said industry associates have access to the specifying client's uniquely related records.

14. The Internet-based lubricant evaluation and reporting system according to claim 13, further comprising at least one lubricant test laboratory connected through the Internet to said application service provider, to facilitate data communications related to said lubricant evaluation software over said Internet between said server and said lubricant test laboratories.

15. The Internet-based lubricant evaluation and reporting system according to claim 14, wherein said at least one lubricant test laboratory comprises a plurality of lubricant test laboratories.

16. The Internet-based lubricant evaluation and reporting system according to claim 15, wherein said lubricant evaluation software comprises report generation software executable on said server for generating reports for each of said plurality of clients.

17. The Internet-based lubricant evaluation and reporting system according to claim 16, wherein said reports are transmitted to each of said plurality of clients via the Internet.

18. The Internet-based lubricant evaluation and reporting system according to claim 16, wherein said reports are transmitted to said clients via e-mail.

19. The Internet-based lubricant evaluation and reporting system according to claim 16, wherein said reports are transmitted to said clients via facsimile.

20. The Internet-based lubricant evaluation and reporting system according to claim 17, wherein said reports are selectable and their output format is tailorable by said clients.

21. The Internet-based lubricant evaluation and reporting system according to claim 20, wherein said reports are automatically generated during laboratory processing of said lubricant samples, as said lubricant samples progress through various stages of said laboratory processing.

22. The Internet-based lubricant evaluation and reporting system according to claim 21, wherein said lubricant evaluation software comprises equipment sampling schedules for said clients.

23. The Internet-based lubricant evaluation and reporting system according to claim 22, wherein said equipment sampling schedules are available to said clients via the Internet.

24. The Internet-based lubricant evaluation and reporting system according to claim 23, wherein said lubricant evaluation software permits modification of said equipment sampling schedules by said clients via the Internet.

25. The Internet-based lubricant evaluation and reporting system according to claim 24, wherein said equipment sampling schedules are automatically transmitted to said clients via e-mail.

26. The Internet-based lubricant evaluation and reporting system according to claim 25, wherein said lubricant evaluation software permits just-in-time ordering of lubricant sampling kits for delivery to clients.

27. The Internet-based lubricant evaluation and reporting system according to claim 26, wherein said lubricant evaluation software permits maintenance reminders related to the uniquely related records of a particular client to be generated, for reminding said particular client of maintenance dates and functions.

28. The Internet-based lubricant evaluation and reporting system according to claim 27, wherein said maintenance reminders related to the uniquely related records of a particular client are displayed on said hypertext markup language compliant page when said particular client logs onto said server.

29. The Internet-based lubricant evaluation and reporting system according to claim 28, wherein said maintenance reminders related to the uniquely related records of a particular client are automatically transmitted to said particular client via e-mail.

30. The Internet-based lubricant evaluation and reporting system according to claim 29, wherein said maintenance reminders related to the uniquely related records of a particular client are automatically transmitted to said particular client via facsimile.

31. The Internet-based lubricant evaluation and reporting system according to claim 30, wherein said lubricant evaluation software permits entry by said clients of maintenance schedules and maintenance tracking data.

32. The Internet-based lubricant evaluation and reporting system according to claim 31, wherein said lubricant evaluation software permits said clients to enter data related to performed maintenance, to thereby generate maintenance records on said database.

33. The Internet-based lubricant evaluation and reporting system according to claim 32, wherein said lubricant evaluations software permits each client to modify the pro-active maintenance schedules related to its own uniquely related records.

34. The Internet-based lubricant evaluation and reporting system according to claim 33, wherein said maintenance reminders include lubrication reminders.

35. The Internet-based lubricant evaluation and reporting system according to claim 34, wherein said lubricant evaluation software generates pro-active maintenance schedules related to said lubricant test results and said industry standard data.

36. The Internet-based lubricant evaluation and reporting system according to claim 35, wherein said lubricant evaluation software includes industry standard data related to lubricants, and said reports include reference to said industry standard data.

37. The Internet-based lubricant evaluation and reporting system according to claim 36, wherein said lubricant evaluation software permits selection of one or more of said plurality of lubricant test laboratories by said clients.

38. The Internet-based lubricant evaluation and reporting system according to claim 37, wherein said lubricant evaluation software comprises a plurality of laboratory test packages available to said clients.

39. The Internet-based lubricant evaluation and reporting system according to claim 38, wherein said plurality of test packages are selectable by said clients via said hypertext markup language compliant page.

40. The Internet-based lubricant evaluation and reporting system according to claim 39, wherein said lubricant evaluation software comprises on-line training instructional information related to lubrication and maintenance.

41. The Internet-based lubricant evaluation and reporting system according to claim 40, wherein said lubricant evaluation software comprises a lubrication survey addressable by said clients.

42. The Internet-based lubricant evaluation and reporting system according to claim 41, wherein said lubrication reminders are automatically transmitted to said clients via e-mail.

43. The Internet-based lubricant evaluation and reporting system according to claim 42, wherein said lubricant evaluation software further comprises software permits the merging of technical data related to vibration analysis equipment readings, thermography equipment readings, and ultrasonic equipment readings.

44. The Internet-based lubricant evaluation and reporting system according to claim 43, wherein said lubricant evaluation software provides regulated access by said lubricant test laboratories to said database of lubricant related data.

45. The Internet-based lubricant evaluation and reporting system according to claim 44, wherein said lubricant evaluation software provides regulated access by said lubricant test laboratories to said client's uniquely related records.

46. The Internet-based lubricant evaluation and reporting system according to claim 45, wherein said lubricant evaluation software permits said clients to search for data within their own uniquely related records by means of boolean logic.

47. The Internet-based lubricant evaluation and reporting system according to claim 46, wherein said lubricant evaluation software permits said clients to search for data within their own uniquely related records by means of a lubricant sample reference number.

48. The Internet-based lubricant evaluation and reporting system according to claim 47, wherein said lubricant evaluation software permits said clients to record and indicate the priority of said lubricant test results of said lubricant samples.

49. The Internet-based lubricant evaluation and reporting system according to claim 48, wherein said lubricant evaluation software compiles a diagnostic history for each sampling point and specific unit from which said lubricant samples were taken.

50. The Internet-based lubricant evaluation and reporting system according to claim 49, wherein said database of lubricant related data further comprises a performance record database of sampling points and specific units, and lubricants.

51. The Internet-based lubricant evaluation and reporting system according to claim 1, wherein said lubricant evaluation software permits each original equipment manufacturers to register information related to equipment manufactured by said original equipment manufacturers.

52. The Internet-based lubricant evaluation and reporting system according to claim 51, wherein said lubricant evaluation software permits original equipment manufacturers to access lubricant test results in order to build a database of lubrication characteristics and problems related to the equipment of said original equipment manufacturers.

53. An Internet-based lubricant evaluation and reporting system comprising:
an application service provider;
a server operable by said application service provider, said server including an operating control system, an Internet connection and lubricant evaluation software executable on said control system to administer a database of lubricant related data;
a client connected over the Internet to said application service provider, by an Internet browser running on a remote computer non-local from said application service provider, to thereby facilitate communications related to the use of said lubricant evaluation software over said Internet between said server and said client; and
an industry associate connected over the Internet to said application service provider, by an Internet browser running on a remote computer non-local from said application service provider, to thereby facilitate communications related to the use of said lubricant evaluation software over said Internet between said server and said industry associate;

wherein said client and industry associate are thereby interconnected through the Internet and said server to facilitate communications between said client and said industry associate;

wherein said Internet-based lubricant evaluation and reporting system further comprises a plurality of clients, each client connected over the Internet to said application service provider, by an Internet browser running on a remote computer non-local from said application service provider, to thereby facilitate communications related to the use of said lubricant evaluation software over said Internet between said server and said clients;

wherein said data on said database comprises records uniquely related to each of said plurality of clients, the records for each client being separate and distinct from the records for each other client;

wherein said lubricant evaluation software permits each of said plurality of clients to access its own uniquely related records in said database, and selectively precludes each of said plurality of clients from accessing the records in said database of each other client; and wherein said lubricant evaluation software permits said clients to search for data within their own uniquely related records by means of a lubricant sample date.

54. The Internet-based lubricant evaluation and reporting system according to claim 53, further comprising a plurality of industry associates, each industry associate connected over the Internet to said application service provider, by an Internet browser running on a remote computer non-local from said application service provider, to thereby facilitate communications related to the use of said lubricant evaluation software over said Internet between said server and said industry associates.

55. The Internet-based lubricant evaluation and reporting system of claim 54, wherein said communications related to said lubricant evaluation software comprise data communications.

56. The Internet-based lubricant evaluation and reporting system of claim 55, wherein said communications related to said lubricant evaluation software are conducted via a hypertext markup language compliant page on said server.

57. The Internet-based lubricant evaluation and reporting system of claim 56, wherein website addresses related to said industry associates are made available by said server to thereby permit said clients access to hypertext markup language compliant pages related to said industry associates.

58. The Internet-based lubricant evaluation and reporting system of claim 56, wherein said website addresses related to said industry associates are stored by said server.

59. The Internet-based lubricant evaluation and reporting system of claim 58, wherein said industry associates are original equipment manufacturers.

60. The Internet-based lubricant evaluation and reporting system of claim 59, wherein said industry associates are suppliers of lubricants.

61. The Internet-based lubricant evaluation and reporting system of claim 60, wherein said industry associates are industry consultants.

62. The Internet-based lubricant evaluation and reporting system of claim 60, wherein said industry associates have regulated access to sampling records retrievably stored within said database of lubricant related data.

63. The Internet-based lubricant evaluation and reporting system of claim 60, wherein said industry associates have regulated access to test result records retrievably stored within said database of lubricant related data.

64. The Internet-based lubricant evaluation and reporting system of claim 60, wherein said industry associates have regulated access to maintenance records retrievably stored within said database of lubricant related data.

65. The Internet-based lubricant evaluation and reporting system of claim 60, wherein said lubricant evaluation software permits portions of said lubricant related data pertaining to equipment warranties to be communicated via the Internet to said industry associates for warranty tracking purposes.

66. The Internet-based lubricant evaluation and reporting system according to claim 65, wherein said lubricant evaluation software permits clients to enter data related to performed maintenance, to thereby generate maintenance records on said database.

67. The Internet-based lubricant evaluation and reporting system according to claim 66, wherein said database of lubricant related data further comprises a performance record database of sampling points and specific units, and lubricants.

68. The Internet-based lubricant evaluation and reporting system of claim 53, further comprising at least one lubricant test laboratory connected through the Internet to said application service provider, to facilitate data communications related to said lubricant evaluation software over said Internet between said server and said at least one lubricant test laboratory.

69. The Internet-based lubricant evaluation and reporting system according to claim 68, wherein said at least one lubricant test laboratory comprises a plurality of lubricant test laboratories.

70. The Internet-based lubricant evaluation and reporting system of claim 69, wherein said lubricant evaluation software provides regulated access by said lubricant test laboratories to said database of lubricant related data.

71. The Internet-based lubricant evaluation and reporting system according to claim 53, wherein said lubricant evaluation software permits each original equipment manufacturers to register information related to equipment manufactured by said original equipment manufacturers.

72. The Internet-based lubricant evaluation and reporting system according to claim 71, wherein said lubricant evaluation software permits original equipment manufacturers to access lubricant test results in order to build a database of lubrication characteristics and problems related to the equipment of said original equipment manufacturers.

73. An Internet-based lubricant evaluation and reporting system comprising:

an application service provider;

a server operable by said application service provider, said server including an operating control system, an Internet connection and lubricant evaluation software executable on said control system to administer a database of lubricant related data;

wherein said data on said database compnses records uniquely related to each of said plurality of clients, the records for each client being separate and distinct from the records for each other client;

software executable on said server for permitting each of said plurality of clients to access its own uniquely related records in said database, and for selectively precluding each of said plurality of clients from accessing the records in said database of each other client;

software executable on said server for receiving input from each one of said plurality of clients;

software executable on said server for selectively transmitting data from said server to each of said plurality of clients; and wherein said lubricant evaluation software permits said clients to search for data within their own uniquely related records by means of a lubricant sample date.

74. The Internet-based lubricant evaluation and reporting system of claim 73, wherein said software for selectively precluding each of said plurality of clients from accessing the records in said database of each other client, also permits each client to specify which other clients have access to the specifying client's uniquely related records.

75. The Internet-based lubricant evaluation and reporting system of claim 70, wherein said software for selectively precluding each of said plurality of clients from accessing the records in said database of each other client, also permits each client to specify which industry associates have access to the specifying client's uniquely related records.

* * * * *